(12) United States Patent
Yagi et al.

(10) Patent No.: US 8,263,282 B2
(45) Date of Patent: Sep. 11, 2012

(54) FUEL CELL SYSTEM AND CONTROL METHOD THEREOF

(75) Inventors: Ryosuke Yagi, Kawasaki (JP); Takahiro Suzuki, Tokyo (JP); Yuusuke Sato, Tokyo (JP); Eiichi Sakaue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1167 days.

(21) Appl. No.: 11/762,927

(22) Filed: Jun. 14, 2007

(65) Prior Publication Data

US 2007/0264548 A1  Nov. 15, 2007

Related U.S. Application Data

(63) Continuation-in-part of application No. 11/531,582, filed on Sep. 13, 2006, now Pat. No. 8,053,120.

(30) Foreign Application Priority Data

Dec. 14, 2005  (JP) .................................. 2005-360700

(51) Int. Cl.
  *H01M 8/04* (2006.01)
(52) U.S. Cl. ........ 429/442; 429/433; 429/434; 429/443; 429/447; 429/448; 429/449
(58) Field of Classification Search .................. 429/433, 429/434, 442, 443, 447, 448, 449
See application file for complete search history.

(56) References Cited

U.S. PATENT DOCUMENTS

| | | | | |
|---|---|---|---|---|
| 5,723,228 | A * | 3/1998 | Okamoto ....................... | 429/437 |
| 2003/0129464 | A1 * | 7/2003 | Becerra et al. .................. | 429/25 |
| 2004/0033401 | A1 * | 2/2004 | Mardilovich et al. ........... | 429/26 |
| 2004/0224198 | A1 * | 11/2004 | Ninomiya et al. .............. | 429/22 |
| 2005/0164062 | A1 * | 7/2005 | An et al. ......................... | 429/26 |
| 2009/0325006 | A1 | 12/2009 | Yagi et al. | |

FOREIGN PATENT DOCUMENTS

| | | |
|---|---|---|
| JP | 5-258760 | 10/1993 |
| JP | 2005-11633 | 1/2005 |
| JP | 2005-32610 | 2/2005 |
| JP | 2005-93143 | 4/2005 |
| JP | 2005-108718 A | 4/2005 |
| JP | 2005-259647 A | 9/2005 |
| JP | 2005-322631 A | 11/2005 |

OTHER PUBLICATIONS

Japanese Office Action mailed on Oct. 5, 2010 in corresponding Japanese Application No. 2005-360700 (with an English Translation).

* cited by examiner

*Primary Examiner* — Eugenia Wang
(74) *Attorney, Agent, or Firm* — Oblon, Spivak, McClelland, Maier & Neustadt, L.L.P.

(57) ABSTRACT

In a power generation unit incorporated in a fuel cell system, a mixture fuel with a certain concentration is supplied to an anode, power is generated by electrochemical reaction between the anode and a cathode exposed to air, and a discharge liquid containing an unreacted mixture fuel is discharged from the anode. The power generation unit is connected to a fuel circulation path for circulating the discharge liquid to the anode. If a mixture fuel is low in pressure, a fuel supply unit supplies fuel to the fuel circulation path. The temperature of the power generation unit is controlled in accordance with the concentration or volume of the mixture fuel supplied to the anode.

11 Claims, 19 Drawing Sheets

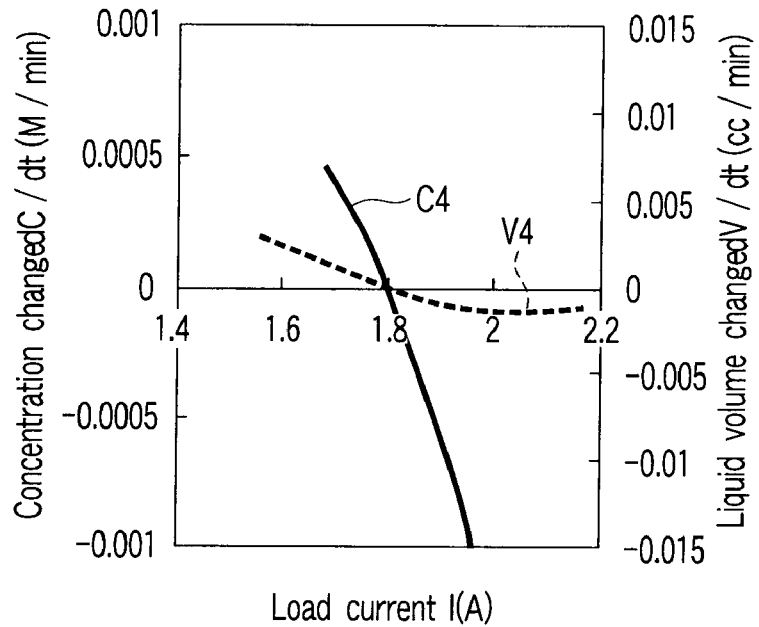
F I G. 10
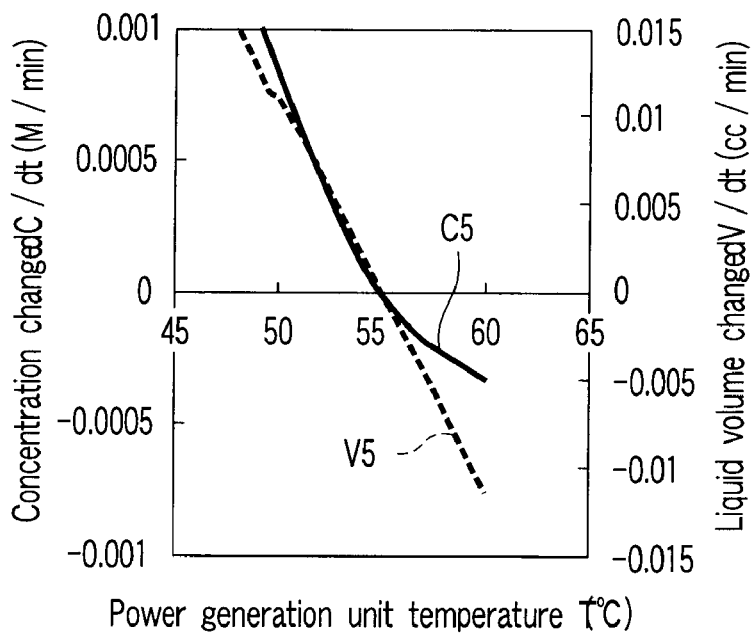
F I G. 11

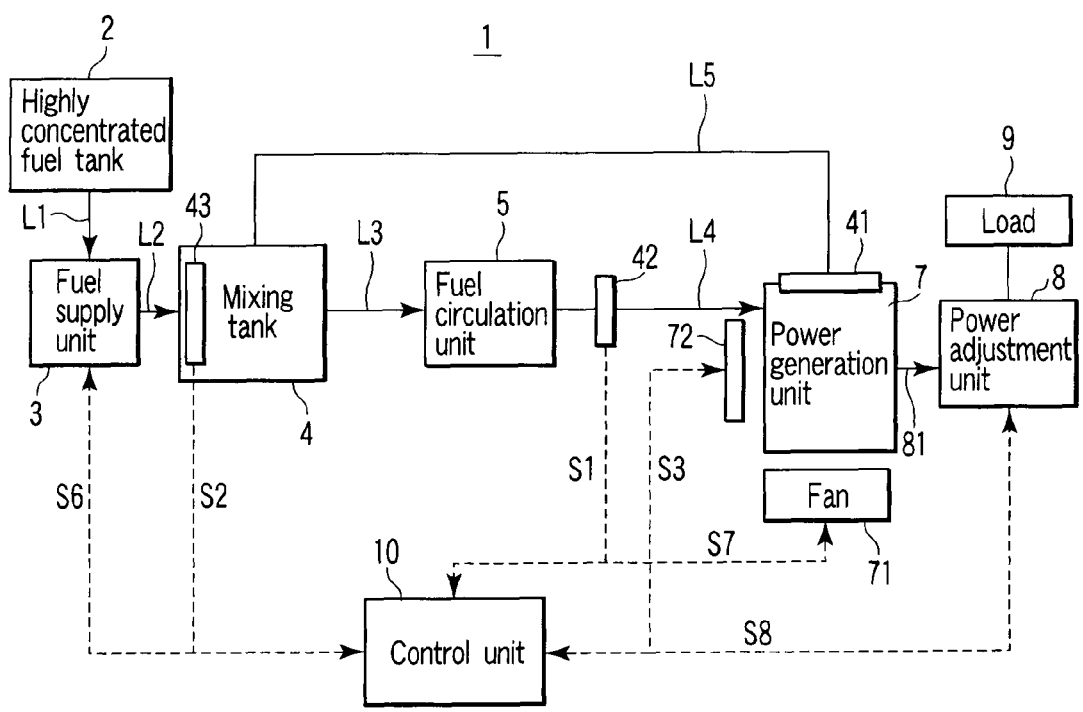
F I G. 18

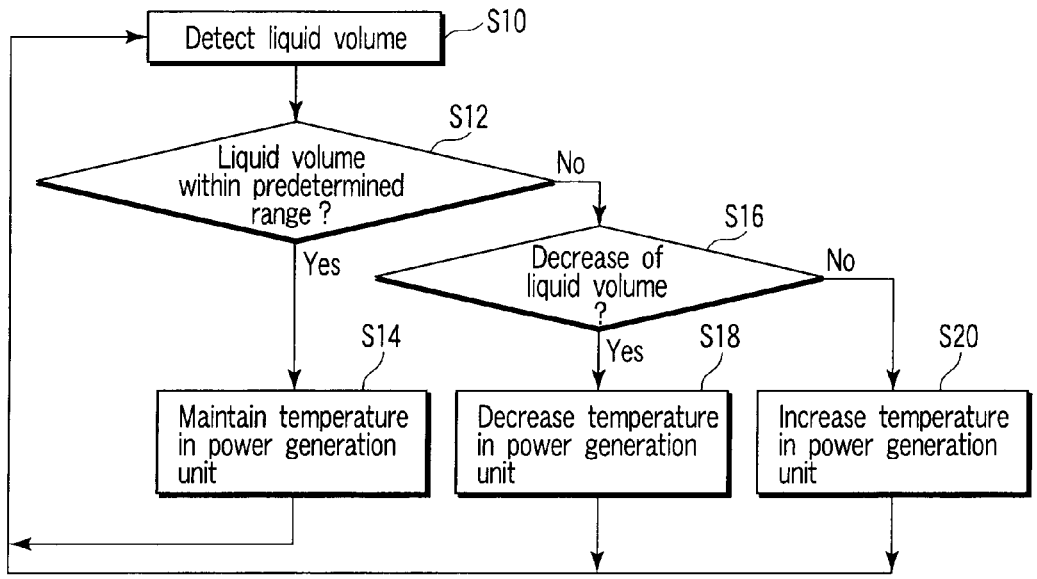
F I G. 19
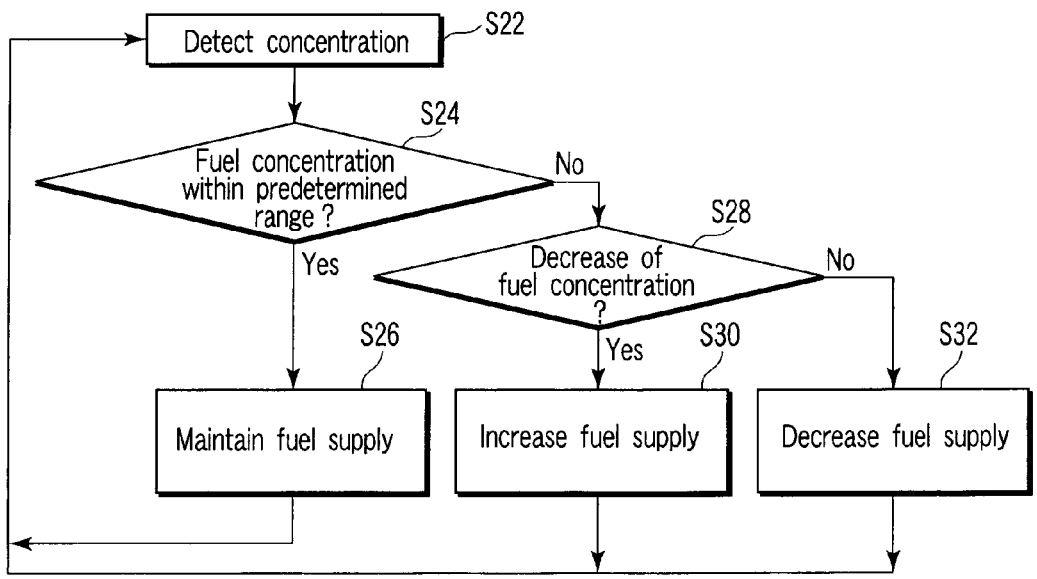
F I G. 20

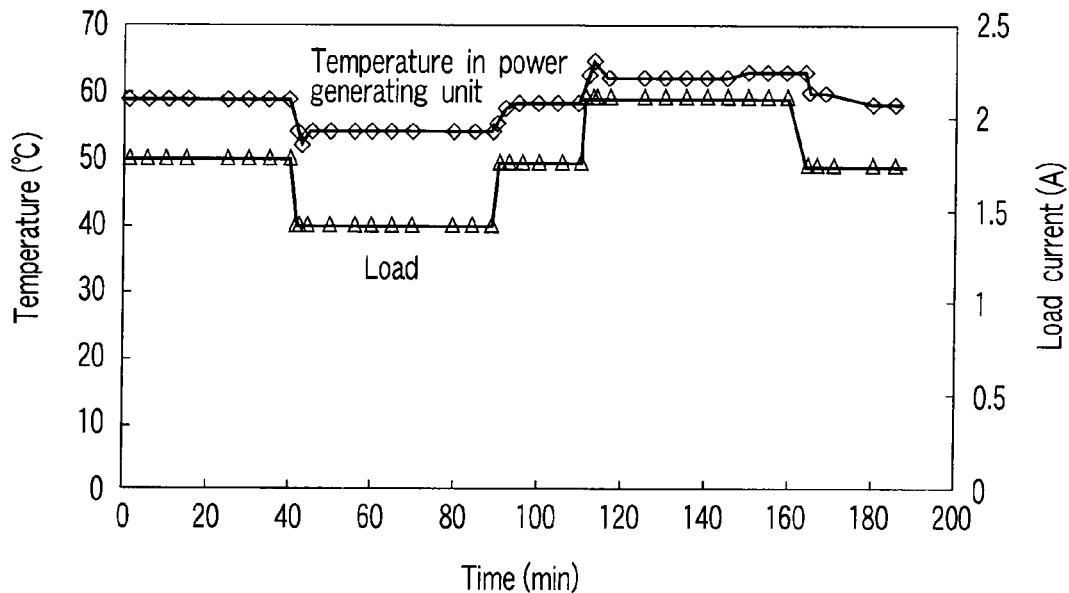
F I G. 23
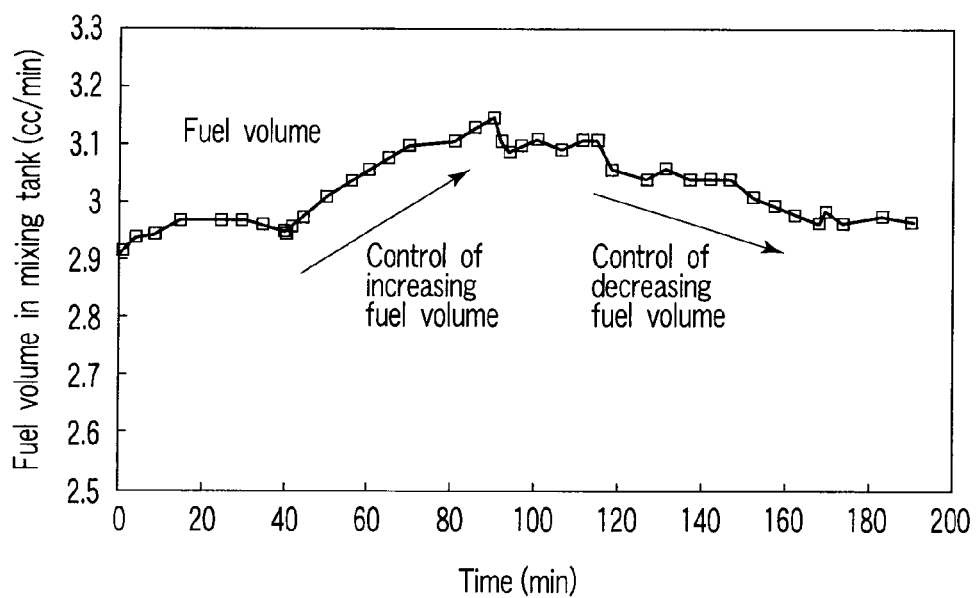
F I G. 24

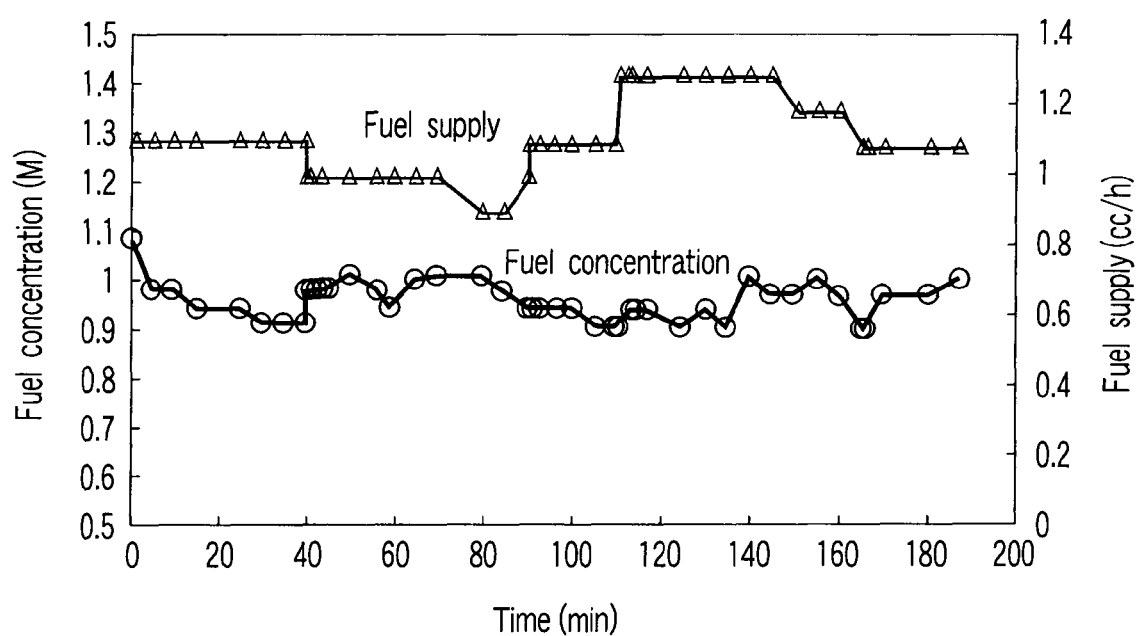
F I G. 25

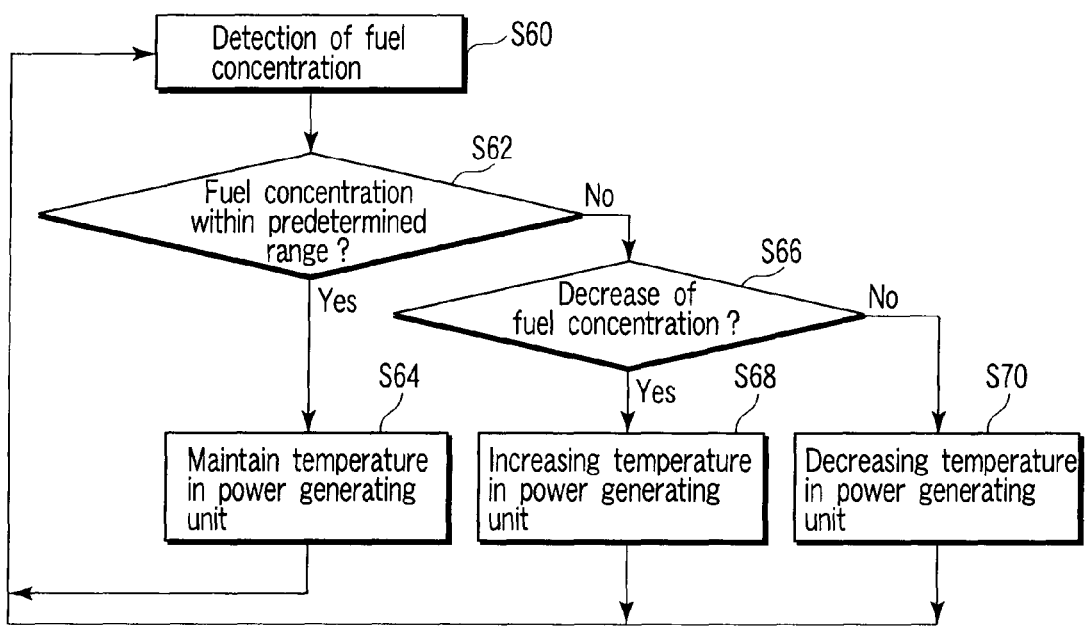
F I G. 27

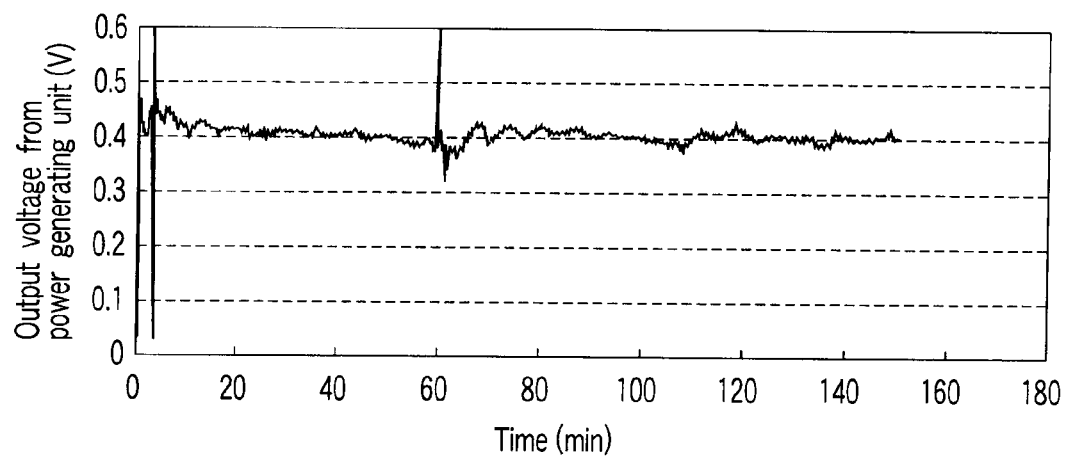
F I G. 28
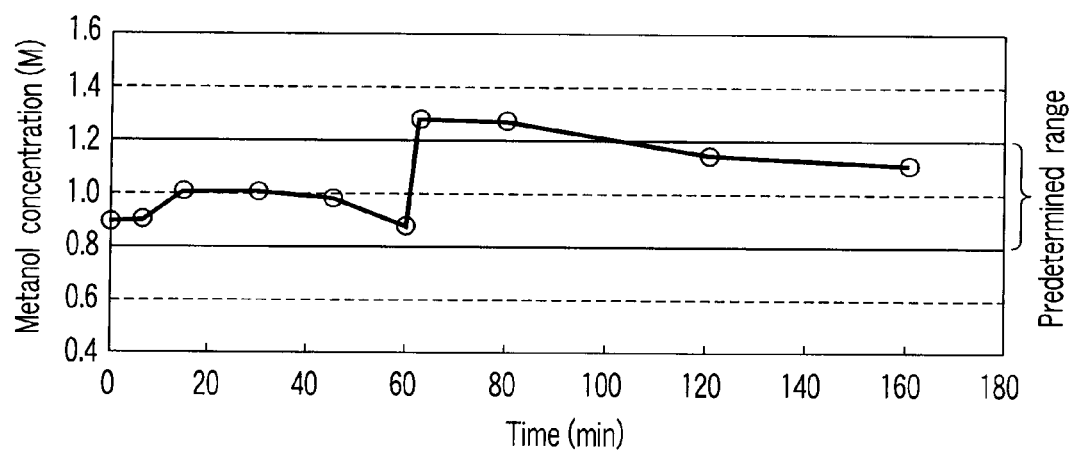
F I G. 29

FUEL CELL SYSTEM AND CONTROL METHOD THEREOF

CROSS-REFERENCE TO RELATED APPLICATIONS

This is a Continuation-in-Part application of U.S. patent application Ser. No. 11/531,582, filed Sep. 13, 2006, which has issued as U.S. Pat. No. 8,053,120 on Nov. 8, 2011, the entire contents of which are incorporated herein by reference.

This application is based upon and claims the benefit of priority from prior Japanese Patent Application No. 2005-360700, filed Dec. 14, 2005, the entire contents of which are incorporated herein by reference.

BACKGROUND OF THE INVENTION

1. Field of the Invention

The present invention relates to a small-sized fuel cell system for use in a portable device and a control method thereof.

2. Description of the Related Art

Direct methanol fuel cells (DMFCS) have been under development as small power sources for portable devices for the following reasons: auxiliary equipment such as a vaporizer and a humidifier is not required; methanol is easier to handle than gas fuels such as hydrogen; and operation at low temperature is possible.

The DMFC comprises a membrane-electrode assembly (MEA), an anode and a cathode, and for the DMFCs, there are an active type using the auxiliary equipment for fuel supply to the anode and the cathode, and a passive type utilizing natural force. In the former active DMFC, the output density of a cell can be increased, but auxiliary equipment is essential, such as a pump for fuel supply to the anode and cathode.

Furthermore, in the DMFC, water of the same mol as that of methanol is required for an anode reaction. Moreover, when highly concentrated methanol is directly supplied to the MEA, methanol crossover is increased, and the efficiency of fuel use thus decreases. Therefore, a water collection mechanism can be provided as auxiliary equipment on the cathode side in order to efficiently collect water produced in a cathode reaction and mix the collected water with the highly concentrated methanol fuel in a mixing tank. It is to be noted that another possibility is a system in which the fuel is only circulated on the anode side without collecting water on the cathode side in order to prevent an increase in the volume of an apparatus due to the installation of the water collection mechanism on the cathode side.

In such a circulation-type fuel cell system, it is important to maintain a proper concentration of the fuel supplied to the anode and to maintain a proper volume of liquid in the mixing tank for sending the fuel to the anode. Various proposals have heretofore been made for systems to control the concentration and volume of the fuel. For example, JPA 2005-32610 (KOKAI) incorporated by reference proposes a system in which the flow volume of a fuel from a highly concentrated fuel tank and a cathode water collection unit are manipulated to control the concentration of a mixture. Further, JPA 2005-11633 (KOKAI) incorporated by reference proposes a system in which the amount of a fuel supplied from a highly concentrated fuel tank and a cathode side water collection amount are manipulated to control the concentration of a mixture. Still further, JPA 5-258760 (KOKAI) incorporated by reference proposes a system in which the amount of a fuel supplied from a highly concentrated fuel tank and the amount of water supplied from a water tank are manipulated to control the volume and concentration of a mixture. Further yet, JPA 2005-108713 (KOKAI) incorporated by reference proposes a system in which air discharged from a cathode is sent into a condensation unit, and a condensation fan and a water collection unit are manipulated to change the amount of water supplied to a mixing tank, thereby controlling the volume and concentration of a mixture.

However, to control the concentration and volume of the fuel in the mixing tank, each of these conventional fuel cell systems comprises a cathode side water collection unit, an anode side fuel supply unit, a water collection/circulation path connecting the cathode side with the anode side, and a water tank to supply water from the outside. The volume occupied by the auxiliary equipment including the water collection unit, the water collection/circulation path and the water tank is large, which increases the size of the entire apparatus. Thus, the conventional fuel cell systems are too large to be used as power sources for portable small devices such as mobile telephones, portable audio terminals and notebook computers.

On the other hand, if the water tank, the water collection/circulation path, etc. are eliminated from the fuel cell system to reduce the size of the system, the efficiency of fuel use decreases.

BRIEF SUMMARY OF THE INVENTION

According to an aspect of the present invention, there is provided a fuel cell system comprising:

a power generation unit including an anode, a cathode and an electrolytic film provided between the anode and the cathode, the anode being supplied with a mixture fuel with a certain concentration, the cathode being exposed to air, power being generated by electrochemical reaction between the anode and the cathode, a discharge liquid containing an unreacted mixture fuel being discharged from the anode, the power generation unit producing heat as a result of the electrochemical reaction;

a power adjustment unit which adjusts power supplied from the power generation unit;

a fuel circulation path which permits the discharge liquid from the power generation unit to be circulated to the anode;

a fuel supply unit which supplies a raw fuel or a highly concentrated fuel to the fuel circulation path to mix the raw fuel or the highly concentrated fuel into the discharge liquid, the fuel circulation unit supplying the raw fuel or the highly concentrated fuel to the fuel circulation path when the mixture fuel is reduced in pressure, the mixture fuel being a mixture of the raw fuel or the highly concentrated fuel and the discharge liquid;

a fuel circulation unit which circulates the mixture fuel to the anode; and a control unit which controls temperature of the power generation unit in accordance with the concentration of the mixture fuel supplied to the anode.

According to another aspect of the present invention, there is provided a fuel cell system comprising:

a power generation unit including an anode, a cathode and an electrolytic film provided between the anode and the cathode, the anode being supplied with a mixture fuel with a certain concentration, the cathode being exposed to air, power being generated by electrochemical reaction between the anode and the cathode, a discharge liquid containing an unreacted mixture fuel being discharged from the anode, the power generation unit producing heat as a result of the electrochemical reaction;

a power adjustment unit which adjusts power supplied from the power generation unit;

a fuel supply unit which supplies a raw fuel or a highly concentrated fuel;

a mixing tank provided across a fuel circulation path which permits a discharge liquid from the power generation unit to be circulated to the anode, the mixing tank containing the mixture fuel, the mixture fuel being a mixture of the raw fuel or the highly concentrated fuel and the discharge liquid;

a fuel circulation unit which circulates the mixture fuel from the mixing tank to the anode; and a control unit which controls temperature of the power generation unit in accordance with a volume of the mixture fuel in the mixing tank.

BRIEF DESCRIPTION OF THE SEVERAL VIEWS OF THE DRAWING

FIG. 10 is a graph showing the relationship between the load current I, the concentration change $\Delta C$ and the liquid volume change $\Delta V$;

FIG. 11 is a graph showing the relationship between the power generation unit temperature T, the concentration change $\Delta C$ and the liquid volume change $\Delta V$;

FIG. 18 is a block diagram illustrating a fuel cell system according to a fifth embodiment, which is obtained by modifying the fuel cell system of FIG. 1;

FIG. 19 is a flowchart useful in explaining the control of the feed rate or feed amount of fuel in the fuel cell system of FIG. 18;

FIG. 20 is a flowchart useful in explaining the control of the concentration of fuel in the fuel cell system of FIG. 18;

FIG. 23 is a graph related to the processes of FIGS. 21 and 22 and illustrating the relationship between variations in the load of a power generation unit incorporated in the fuel cell system of FIG. 18 and variation in the temperature of the power generation unit;

FIG. 24 is a graph illustrating the control, performed in the fuel cell system of FIG. 18, of increasing/decreasing the fuel volume in accordance with variations in the temperature of the power generation unit as shown in FIG. 23;

FIG. 25 is a graph illustrating the relationship between the fuel feed rate or feed amount and fuel concentration in the fuel cell system of FIG. 18;

FIG. 27 is a flowchart useful in explaining processing of controlling the concentration of fuel in the fuel cell system of FIG. 26;

FIG. 28 is a graph illustrating variations in output voltage from a power generation unit incorporated in the fuel cell system of FIG. 26; and FIG. 29 is a graph illustrating the relationship between variations in the concentration of methanol detected by a concentration sensor incorporated in the fuel cell system of FIG. 26 and variations in the output voltage from the power generation unit shown in FIG. 28.

DETAILED DESCRIPTION OF THE INVENTION

A best mode for carrying out the present invention will hereinafter be described with reference to the accompanying drawings.

First Embodiment

Figure 1:
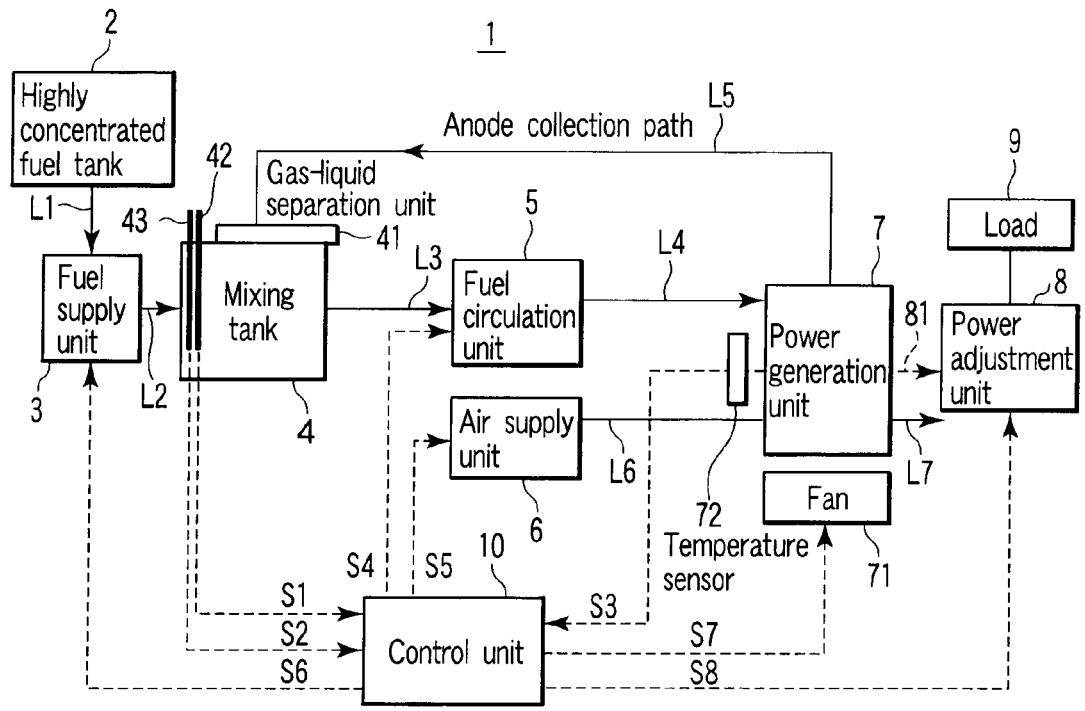
FIG. 1 is a configuration block diagram showing a fuel cell system according to an embodiment of the present invention.

As shown in FIG. 1, a fuel cell system 1 according to a first embodiment of the present invention comprises a power generation unit 7 and auxiliary equipment necessary for the power generation unit to generate power. The system 1 has, as the main auxiliary equipment, a highly concentrated fuel tank 2, a fuel supply unit 3, a mixing tank 4, a fuel circulation unit 5, an air supply unit 6, a power adjustment unit 8 and a control unit 10, and has, as secondary auxiliary equipment, a concentration sensor 42, a liquid volume sensor 43, a fan 71 and a temperature sensor 72.

The above auxiliary equipment is directly or indirectly connected to the power generation unit 7 by a plurality of lines L1 to L7, and a fluid (a liquid, a gas or a gas-liquid mixture) is supplied to the power generation unit 7 through the lines L1 to L7 by use of natural force or mechanical force or both of them and discharged from the power generation unit 7. The method mainly using the natural force (e.g., capillary force) to carry the fluid is called "passive fuel cell system", while the method mainly using the mechanical force (e.g., pumping power) to carry the fluid is called "active fuel cell system".

The overall fuel cell system 1 is totally controlled by the control unit 10. The control unit 10 is connected to the power generation unit 7 and the auxiliary equipment by signal lines, and various signals S1 to S8 are transmitted/received among the control unit 10, the power generation unit 7 and the auxiliary equipment. For example, the concentration sensor 42 detects the concentration of a mixture fuel (e.g., a methanol solution) in the mixing tank 4, and sends a detection signal S1 thereof to the control unit 10. The liquid volume sensor 43 detects the volume of the mixture fuel in the mixing tank 4, and sends a detection signal S2 thereof to the control unit 10. Moreover, the temperature sensor 72 detects the temperature of the power generation unit 7, and sends a detection signal S3 thereof to the control unit 10.

Figure 13:
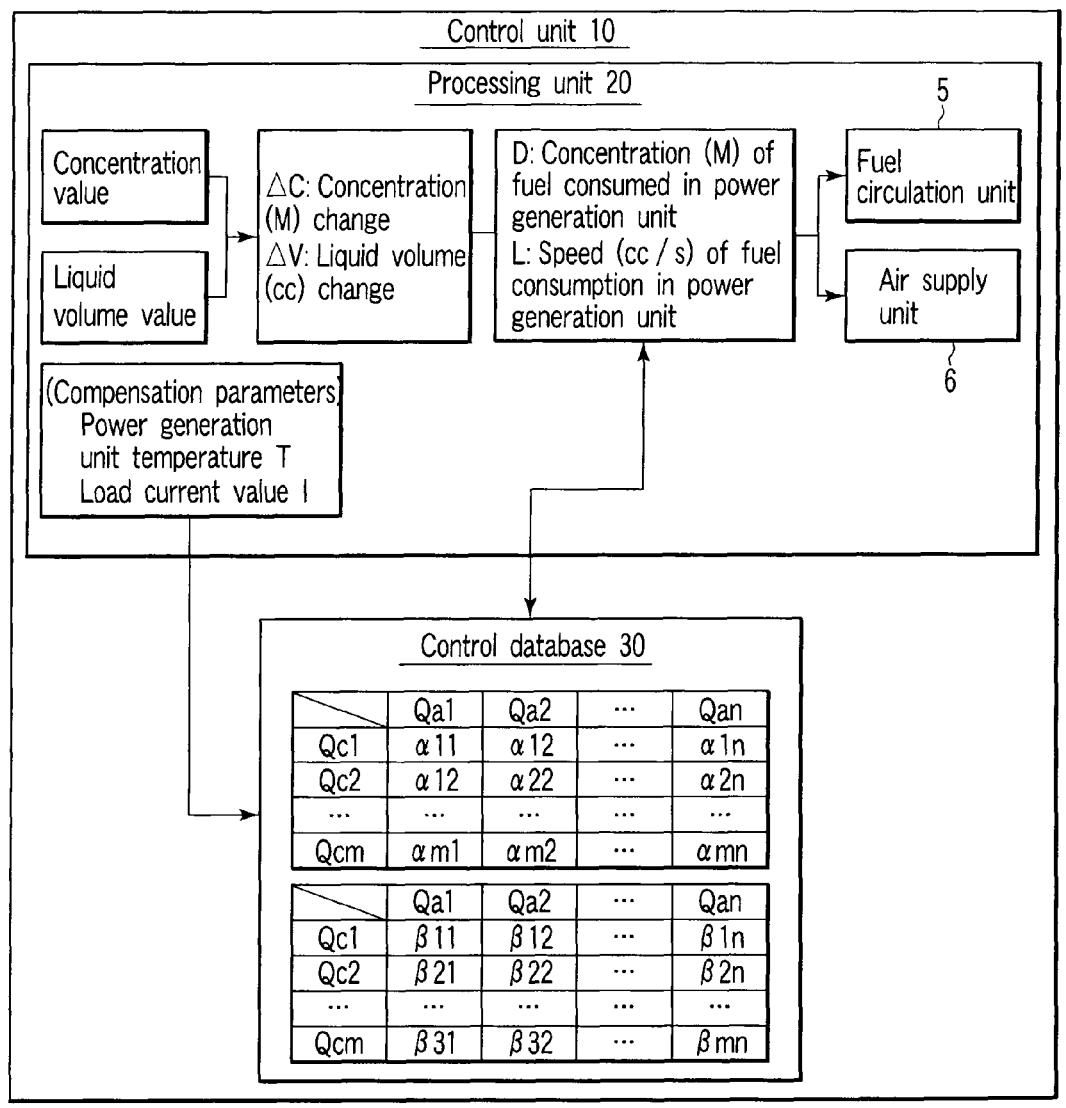
FIG. 13 is a control block diagram of the fuel cell system shown in FIG. 1.

As shown in FIG. 13, the control unit 10 obtains various controlled variables on the basis of the detection signals S1, S2 and S3 and of process data in a database 30, and obtains various manipulated variables on the basis of the obtained controlled variables and various parameter values of a processing unit 20, thus outputting manipulation command signals S4 to S8 to any one or two or more of the fuel circulation unit 5, the fuel supply unit 3, the air supply unit 6, the power adjustment unit 8, and the fan 71 of the power generation unit 7. For example, if the manipulation signal S8 is output from the control unit 10 to the power adjustment unit 8, a load current I applied to a load 9 is adjusted to a desired value. It is to be noted that the process data in the database 30 has been previously obtained by a demonstration experiment, and, for example, represents correlation data on parameters $\alpha$, $\beta$ and various manipulated variable values. Further, the processing unit 20 outputs the manipulation command signals S4 to S8 on the basis of information input from the concentration sensor 42, the liquid volume sensor 43, the temperature sensor 72 and the like and on the basis of the process data in the database 30, and, for example, outputs the manipulation command signals on the basis of data such as concentration control parameters and liquid volume control parameters and of equations.

The power generation unit 7 has therein a stack of an anode/a catalyst layer/an electrolytic film catalyst layer/a cathode (membrane-electrode assembly [MEA]), an anode flow path plate and a cathode flow path plate. The power generation unit 7 converts chemical energy of the fuel into electric energy to generate power. The MEA is configured as follows: catalyst particles are applied to both surfaces of the electrolytic film made from a proton-conductive solid polymer membrane in such a manner as to sandwich the electrolytic film, on which methanol and air are supplied to the catalyst layer, and at the same time, carbon dioxide and water produced in a reaction are discharged from the catalyst layer, and then a gas diffusion layer is mounted to smoothly collect electrons which have reacted. An entrance of the anode flow path plate is connected to the line L4, and an exit thereof is connected to the line L5. An entrance of the cathode flow path plate is connected to the line L6, and an exit thereof is connected to the line L7 which discharges by-product carbon dioxide to the outside of the system.

Furthermore, the power generation unit 7 has the fan 71 and the temperature sensor 72. The fan 71 is used as temperature adjustment means for blowing air to the power generation unit 7 to cool off the power generation unit 7. It is to be noted that for the temperature adjustment means, a peltier element, a water-cooling jacket or the like can be used instead of the fan 71. Further, the temperature adjustment means can include not only the means for cooling off the power generation unit 7 but also a heater to heat the power generation unit 7. The temperature sensor 72 detects the temperature of the power generation unit 7, and sends the temperature detection signal S3 to the control unit 10. For the temperature sensor 72, it is possible to use, for example, a thermocouple provided on the surface of the power generation unit 7 or provided inside the power generation unit 7.

A liquid is used for the fuel supplied to the anode. Hereinafter, the methanol solution is assumed as one example of the fuel. The highly concentrated fuel tank 2 stores a raw fuel such as a methanol solution having a purity of 99.9% or more, or a highly concentrated fuel including a small amount of water such as a mixed solution of methanol and water having a concentration of 10 mol/liter (mol/liter will hereinafter be referred to as "M") or more. It is to be noted that the highly concentrated fuel tank 2 can be supplied with the raw fuel or the highly concentrated fuel from an unshown supply port.

The fuel supply unit 3 has a built-in pump whose operation is controlled by the control unit 10, and is connected to the highly concentrated fuel tank 2 via the line L1 and connected to the mixing tank 4 via the line L2. When the control unit 10 drives the pump of the fuel supply unit 3, the raw fuel or the highly concentrated fuel is supplied from the highly concentrated fuel tank 2 into the mixing tank 4. Instead of using a small electromagnetic pump as in the fuel circulation unit 5, it is possible to use for the fuel supply unit 3 a method which enables the supply of the fuel in a predetermined flow volume and which does not require drive electric power. For example, it is possible to conceive a method using a water head difference between the highly concentrated fuel tank 2 and the mixing tank 4, or a method using capillary force by a porous material.

The line L5 is a return flow path provided from the power generation unit 7 to the mixing tank 4. This line L5 functions as an anode collection path to collect a mixed solution remaining without being consumed in the anode of the power generation unit 7 (a mixed solution of the unreacted fuel and water which have not been consumed in the anode) and carbon dioxide, that is, an emission discharged from the anode.

The mixing tank 4 communicates with the fuel supply unit 3 via the line L2, and communicates, on the other hand, with an anode side of the power generation unit 7 via the line L5. In the mixing tank 4, the raw fuel or the highly concentrated fuel from the highly concentrated fuel tank 2 is mixed with the mixed solution collected from the anode of the power generation unit 7. It is to be noted that the mixing tank 4 contains a diluted methanol solution having an initial concentration ranging from 1.5M to 2.5M (initial mixture fuel) for example.

A gas-liquid separation unit 41 is attached to a connection portion between the mixing tank 4 and the line L5. The gas-liquid separation unit 41 has a gas-liquid separation film to separate a gas including carbon dioxide from the mixed solution.

The mixing tank 4 comprises detection means for obtaining information on the concentration and volume of the mixture fuel. The concentration sensor 42 can be used as means for detecting the concentration of the mixture fuel. The concentration sensor 42 is installed inside the mixing tank 4 as shown in FIG. 1, or at a proper place of the line L3, L4. However, the concentration sensor 42 is an optional component in the system of the present embodiment. This is because the concentration of the mixture fuel can also be detected by software instead of the concentration sensor (hardware). That is, the control unit 10 can possess a computer program which estimates the concentration of the mixture fuel from the output and the information on the temperature of the power generation unit 7. It is to be noted that, for example, a supersonic type or near-infrared multiple wavelength light type sensor can be used for the concentration sensor 42.

The liquid volume sensor 43 can be used as means for detecting the volume of the mixture fuel. The liquid volume sensor 43 is installed inside the mixing tank 4 as shown in FIG. 1, and detects the level of the mixture fuel in the tank 4.

Instead of the liquid volume sensor (level meter) 43, it is also possible to use means for measuring the weight of the mixing tank 4 (e.g., a load cell).

The fuel circulation unit 5 circulates the mixture fuel in a loop path composed of the lines L3, L4 and L5 including the power generation unit 7 and the mixing tank 4. The fuel circulation unit 5 has a built-in pump whose operation is controlled by the control unit 10, and is connected to the mixing tank 4 via the line L3 and connected to the anode side of the power generation unit 7 via the line L4. For the fuel circulation unit 5, it is preferable to use a small electromagnetic pump in that it is small, consumes low power and allows its supply flow volume to be controlled from the outside.

The air supply unit 6 has a built-in air pump or fan whose operation is controlled by the control unit 10, and is connected to a cathode side of the power generation unit 7 via the line L6, and supplies air to the cathode of the power generation unit 7. For the air supply unit 6, it is preferable to use a small air pump or fan in that it is small and allows its supply flow volume to be controlled from the outside.

The power adjustment unit 8 is provided between the power generation unit 8 and the load 9 to smoothly take an output from the power generation unit 7 out to the load 9. A circuit in the power adjustment unit 8 is connected to an output side of the control unit 10, so that the load current I applied to the load 9 is controlled. It is to be noted that power generated in the power generation unit 7 is output to the power adjustment unit 8 via a lead wire 81.

A methanol consumption amount per unit time and unit area in the anode during power generation in a direct methanol fuel cell is expressed by the amount of methanol used in a reaction and a crossover amount of methanol moved to the anode side through the electrolytic film. Specifically, a methanol consumption amount $J^{CONS}_{CH3OH}$ in the anode is provided by Equation (1) below.

$$J^{cons}_{CH3OH} = \frac{I}{6F}(1+\beta) \quad (1)$$

Note that "I" indicates a load current (A), "F" indicates Faraday constant, "β" indicates the ratio of a movement amount of methanol moving in a crossover manner to the amount of methanol used in a reaction during power generation.

Likewise, a consumption amount of water on the anode side is expressed by the amount of water used in a reaction and a crossover amount of water moving to the cathode side and the anode side through the electrolytic film. Specifically, a water consumption amount $J^{CONS}_{H2O}$ in the anode is provided by Equation (2) below.

$$J^{cons}_{H2O} = \frac{I}{6F}(1+6\alpha) \quad (2)$$

Note that "α" is the ratio of a movement amount of a water molecule to the movement amount of one proton produced in a reaction. Therefore, the methanol consumption amount in the anode is proportionate to the methanol crossover amount and the load current I, and the water consumption amount is likewise proportionate to the water crossover amount and the load current I. Thus, the load current I, the methanol crossover amount and the water crossover amount are changed, and the consumption amounts of methanol and water are adjusted, thereby making it possible to control the methanol amount and water amount in the mixed solution circulating through the lines L3, L4 and L5. The present embodiment is characterized in that the crossover amounts of methanol and water are changed to control the amounts of methanol and water without significantly changing the output.

[Correlation Between Concentration C of Mixture Fuel and Parameters α, β]

Figure 2:
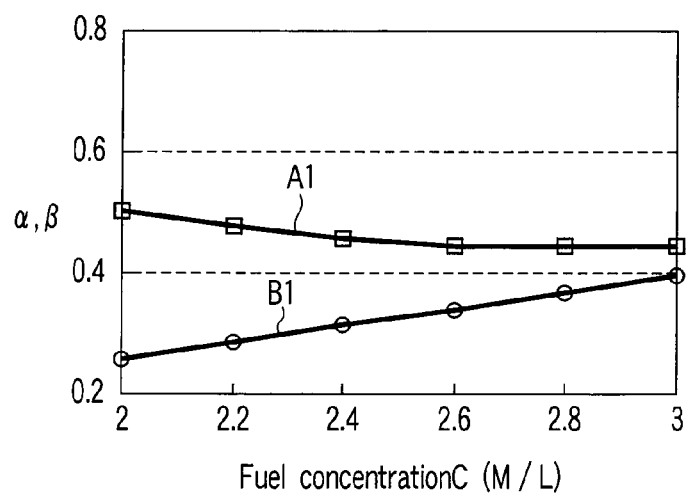
FIG. 2 is a graph showing the relationship between a concentration C of a mixture fuel and parameters $\alpha, \beta$.

An experiment was carried out under the condition that the load current I was 1.8 A and an air supply amount $Q_c^{Air}$ was 87 cc/min. The results are shown in FIG. 2. A characteristic curve A1 (white square plots) in FIG. 2 indicates a relation between a concentration C of the mixture fuel supplied to the anode and α, and a characteristic curve B1 (white circular plots) indicates a relation between the concentration C of the mixture fuel and β. Here, the concentration C can be detected by the concentration sensor 42. For β, a result was obtained in which it gradually increased as the concentration C of the mixture fuel became higher, and for α, a result was obtained in which it gradually decreased as the concentration C of the mixture fuel became higher. Moreover, it could be confirmed that the variation of α is relatively smaller than that of β.

[Correlation Between Air Supply Amount $Q_c^{Air}$ and Parameters α, β]

Figure 3:
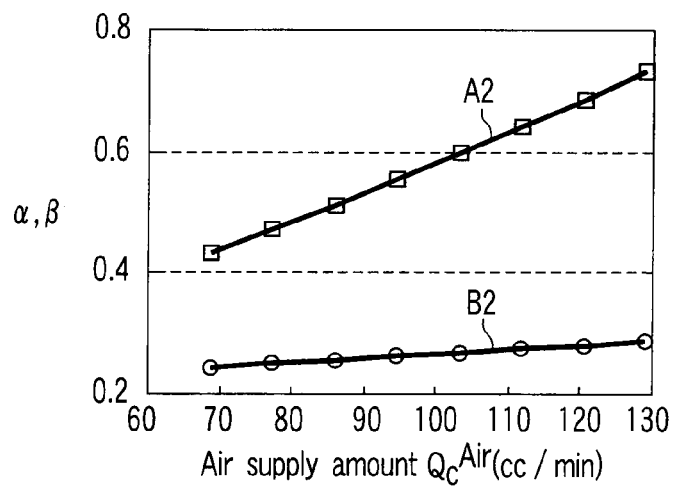
FIG. 3 is a graph showing the relationship between an air supply amount $Q_c^{Air}$ and the parameters $\alpha, \beta$.

An experiment was carried out using a mixture fuel having a concentration of 2M, under the condition that the load current I was 1.8 A. The results are shown in FIG. 3. A characteristic curve A2 (white square plots) in FIG. 3 indicates a relation between the air supply amount $Q_c^{Air}$ and α, and a characteristic curve B2 (white circular plots) indicates a relation between the air supply amount $Q_c^{Air}$ and β. If the air supply amount $Q_c^{Air}$ increased, the humidity of the gas diffusion layer decreased, and α monotonously increased. The reason is that the amount of water that can be contained in the air increases, and water produced in the cathode can be contained in the supplied air in a large amount.

On the other hand, β tended to increase as the air supply amount $Q_c^{Air}$ increased, but the increase was small as compared with the variation of α. In such a manner, the supply amount $Q_c^{Air}$ of air to the cathode is manipulated and the humidity of the gas diffusion layer is changed, such that both the parameters α, β are adjusted and the methanol consumption amount and the water consumption amount in the line L5 can be changed. Here, a flow volume range for the air supply amount $Q_c^{Air}$ is designed to provide an air supply amount equal to or greater than that necessary for the power generation in order to ensure the output of the power generation unit 7, and the air supply unit 6 is manipulated so that the range may satisfy Equation (3) below.

$$24451\frac{I}{0.84F} < Q_c^{Air} \; (cc/s) \quad (3)$$

Note that I indicates a load current (A) and F indicates Faraday constant.

[Correlation Between Fuel Supply Amount $Q_a^{MeOH}$ and Parameters α, β]

Figure 4:
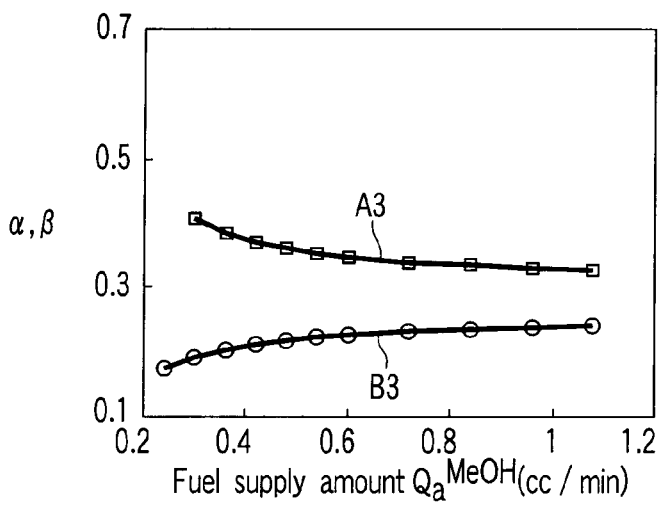
FIG. 4 is a graph showing the relationship between a fuel supply amount $Q_a^{MeOH}$ and the parameters $\alpha, \beta$.

An experiment was carried out using a mixture fuel having a concentration of 2M, under the condition that an air supply amount $Q_c^{Air}$ was 87 cc/min and the load current I was 1.8 A. The results are shown in FIG. 4. A characteristic curve A3 (white square plots) in FIG. 4 indicates a change of α with respect to a fuel supply amount $Q_a^{MeOH}$, and a characteristic curve B3 (white circular plots) indicates a change of β with respect to the fuel supply amount $Q_a^{MeOH}$. It was found out that if the supplied mixture fuel was increased with respect to the fuel supply amount $Q_a^{MeOH}$ necessary for the power generation, β increased and α decreased.

The mixture fuel in the mixing tank 4 is sent into the power generation unit 7 by the fuel circulation unit 5, and sent to the anode through the anode flow path plate. Thus, if the fuel circulation unit 5 is manipulated and the flow volume of the fuel sent to the anode is changed, it is possible to generate a change of a concentration difference between an entrance side and an exit side of the anode flow path plate because of the consumption of the fuel and water by a power generation reaction. Here, in order to make a great concentration difference between the entrance and exit of the flow path plate, it is preferable that the flow path of the anode flow path plate has a serpentine shape rather than a parallel shape. This is because the flow path of the serpentine shape makes larger fuel concentration profile across the MEA.

In such a flow path, if the fuel circulation unit 5 is manipulated and the flow volume of the mixture fuel sent to the anode is decreased, the fuel concentration at an exit of the power generation unit 7 decreases, β decreases, and α increases. On the contrary, if the flow volume of the mixture fuel sent to the anode is increased, the fuel concentration at the exit of the power generation unit 7 increases, p increases, and a decreases.

In this way, the fuel circulation unit 5 is manipulated to change the fuel supply amount $Q_a^{MeOH}$, and a concentration gradient is provided in the flow path to adjust β and α, thereby making it possible to control the consumption amounts of methanol and water in the line L5. Owing to the fuel circulation unit 5, the fuel supply amount $Q_a^{MeOH}$ is controlled within a range satisfying a relation of Equation (4) below by the control unit 10.

$$\frac{I}{6F}\frac{1000}{C} < Q_a^{MeOH} < \frac{I}{6F}\frac{6000}{C} \; (cc/s) \quad (4)$$

Note that I is the load current (A), F is Faraday constant, and C is a concentration (M) of the mixture fuel in the mixing tank. It is to be noted that the fuel supply amount $Q_a^{MeOH}$ is equal to or more than the amount of the fuel necessary for the power generation reaction. Moreover, as the crossover increases, it is preferable that a variable range of the fuel supply amount $Q_a^{MeOH}$ is set to a region which allows a greater change gradient of α, β with respect to a change in the fuel supply amount $Q_a^{MeOH}$. Under these circumstances, considering that the region is used where the gradient of changes in α, β is great with respect to the change in the fuel supply amount $Q_a^{MeOH}$, the fuel supply amount $Q_a^{MeOH}$ is set to be equal to or less than six times the fuel supply amount $Q_a^{MeOH}$ necessary for the power generation consumption. The reason is that even if the fuel is supplied in a fuel supply amount over six times the fuel supply amount $Q_a^{MeOH}$ necessary for the power generation consumption, the changes in α, β are small for an increase of the fuel supply amount $Q_a^{MeOH}$, and the effects are saturated. Moreover, there is also a limitation in the fuel supply amount $Q_a^{MeOH}$ of the fuel circulation unit 5.

[Correlation Between Load Current I and Parameters α, β]

Figure 5:
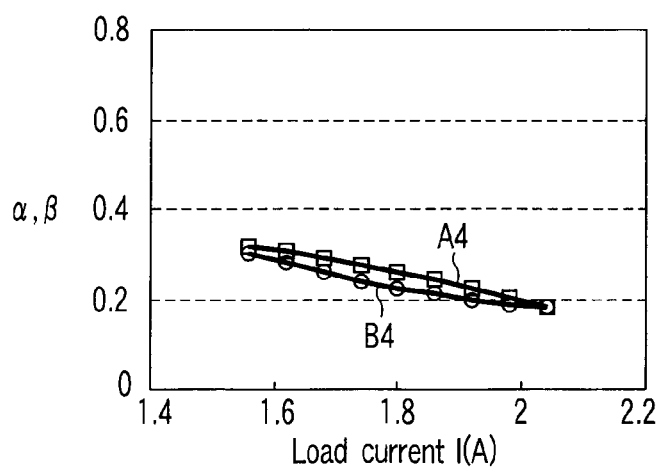
FIG. 5 is a graph showing the relationship between a load current I and the parameters $\alpha, \beta$.

An experiment was carried out under the condition that the concentration of the mixture fuel was 2M and the air supply amount $Q_c^{Air}$ was 87 cc/min. The results are shown in FIG. 5. A characteristic curve A4 (white square plots) in FIG. 5 indicates a change of a with respect to the load current I, and a characteristic curve B4 (white circular plots) indicates a change of β with respect to the load current I. It was found out that if the load current I was increased, both α and β decreased, and if the load current I was decreased, both α and β increased.

[Correlation Between Temperature T of Power Generation Unit and Parameters α, β]

Figure 6:
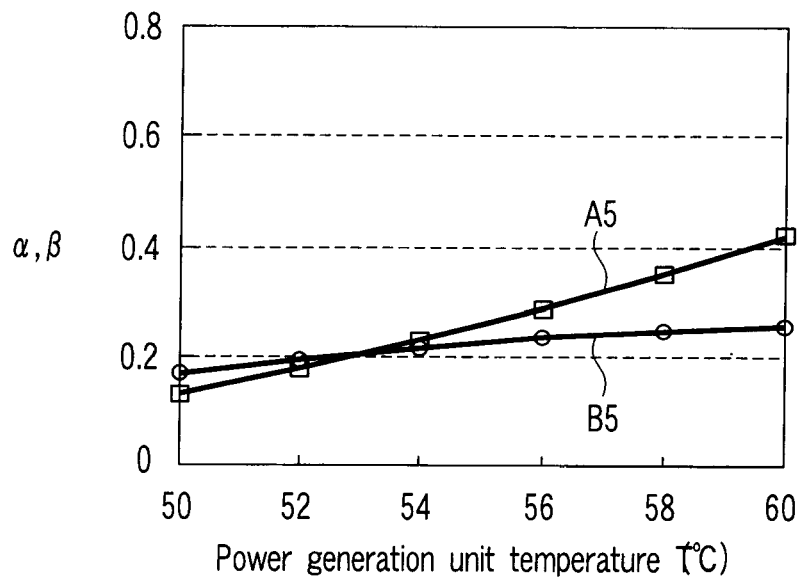
FIG. 6 is a graph showing the relationship between a power generation unit temperature T and the parameters $\alpha, \beta$.

An experiment was carried out under the condition that the concentration of the mixture fuel was 2M and the air supply amount $Q_c^{Air}$ was 87 cc/min. The results are shown in FIG. 6. A characteristic curve A5 (white square plots) in FIG. 6 indicates a change of a with respect to a power generation unit temperature T (° C.), and a characteristic curve B4 (white circular plots) indicates a change of β with respect to the temperature T. It was found out that if the temperature T was raised, both α and β increased, and if the temperature T was dropped, both α and β decreased.

Next, an outline of the operation of the fuel cell system in the present embodiment will be described.

The mixture fuel is supplied from the fuel circulation unit 5 to the anode of the power generation unit 7, and air is supplied from the air supply unit 6 to the cathode. If the system 1 is connected to the load 9 via the power adjustment unit 8, the power generation is started, and methanol and water cause an oxidative reaction in the anode, and moreover, and methanol and water are consumed by crossover movement.

The mixed solution which has not been consumed in the power generation unit 7 and carbon dioxide (reaction product) are sent into the mixing tank 4 through the line L5. At this moment, it is necessary to discharge carbon dioxide out of the system so that carbon dioxide may not circulate in the line L5 again. Thus, the gas-liquid separation unit 41 is attached to the mixing tank 4, and carbon dioxide is separated/removed from the emission by the gas-liquid separation unit 41. A commercially available general-purpose gas-liquid separation film can be used for the gas-liquid separation unit 41. Further, when a gas-liquid separation pipe is used for the gas-liquid separation unit 41, it is not exclusively placed inside the mixing tank 4, but may also be placed outside the mixing tank 4. For example, the gas-liquid separation unit 41 may be installed in the collection line L5 (see FIG. 16). It is to be noted that the raw fuel or the highly concentrated fuel equal to the flux of methanol and water consumed in the power generation unit 7 is supplied into the mixing tank 4 from the highly concentrated fuel tank 2 at a predetermined flow volume.

The concentration and volume of the mixture fuel in the mixing tank 4 are measured by the sensors 42 and 43, respectively, and the measurement data are sent to the control unit 10. The control unit 10 manipulates the fuel circulation unit 5 and the air supply unit 6 on the basis of the measurement data and predetermined process data to have proper concentration and volume of the mixture fuel in the mixing tank 4.

Next, there will be described a correlation among a concentration change dC/dt and a liquid volume change dV/dt per unit time of the mixture fuel in the mixing tank 4, and various parameters, with reference to FIGS. 7 to 11.

An experiment was carried out under the condition that the initial concentration of the mixture fuel in the mixing tank 4 was 2.0M and the liquid volume was 3.0 cc. Various correlation data described below were obtained.

[Correlation Between Fuel Supply Amount $Q_{conc}^{MeOH}$ and dC/dt, dV/dt]

Figure 7:
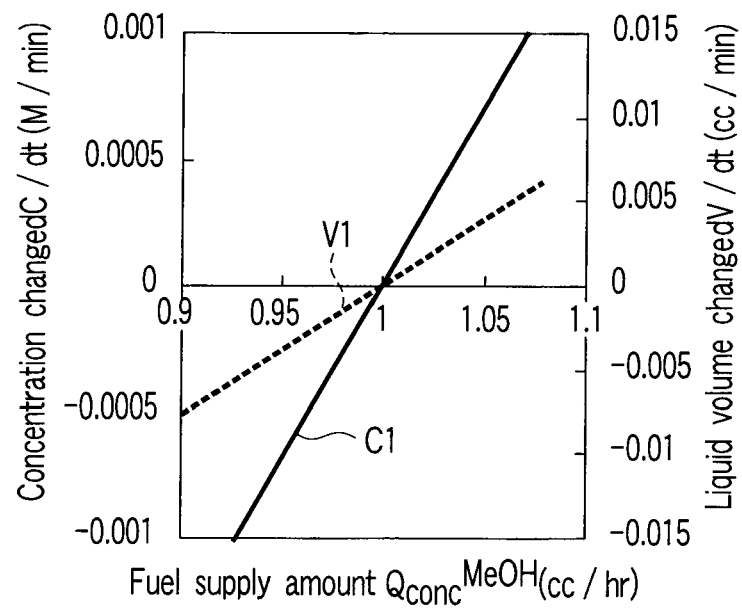
FIG. 7 is a graph showing the relationship between a fuel supply amount $Q_{conc}^{MeOH}$, a concentration change $\Delta C$ and a liquid volume change $\Delta V$.

A characteristic curve C1 in FIG. 7 indicates a relation between a fuel supply amount $Q_{conc}^{MeOH}$ (cc/hr) and a concentration change dC/dt (M/min) per unit time. Further, a characteristic curve V1 indicates a relation between the fuel supply amount $Q_{conc}^{MeOH}$ and a liquid volume change dV/dt per unit time (cc/min). $Q_{conc}^{MeOH}$ is the flow volume of the raw fuel or the highly concentrated fuel supplied from the fuel supply unit 3 into the mixing tank 4. At this point, an operation is performed under the condition that the fuel circulation unit 5, the air supply unit 6, the power adjustment unit 8 and the power generation unit 7 are at a constant temperature.

When the fuel supply unit 3 is manipulated to change the fuel supply amount $Q_{conc}^{MeOH}$, both the concentration change dC/dt per unit time and the liquid volume change dV/dt per unit time (cc/min) increase (characteristic curves C1, V1) as shown in FIG. 7 if the fuel supply amount $Q_{conc}^{MeOH}$ is increased. Thus, if both the concentration and volume of the mixture fuel have decreased as a result of detecting the concentration and volume of the mixture fuel by the concentration sensor 42 and the liquid volume sensor 43, the fuel supply amount $Q_{conc}^{MeOH}$ is increased. On the contrary, if both the concentration and volume of the mixture fuel have increased, the fuel supply amount $Q_{conc}^{MeOH}$ is decreased. If the fuel supply unit 3 is manipulated in this manner, the concentration and volume of the mixture fuel in the mixing tank 4 can be controlled within proper ranges.

[Correlation Between Air Supply Amount $Q_c^{Air}$ and dC/dt, dV/dt]

Figure 8:
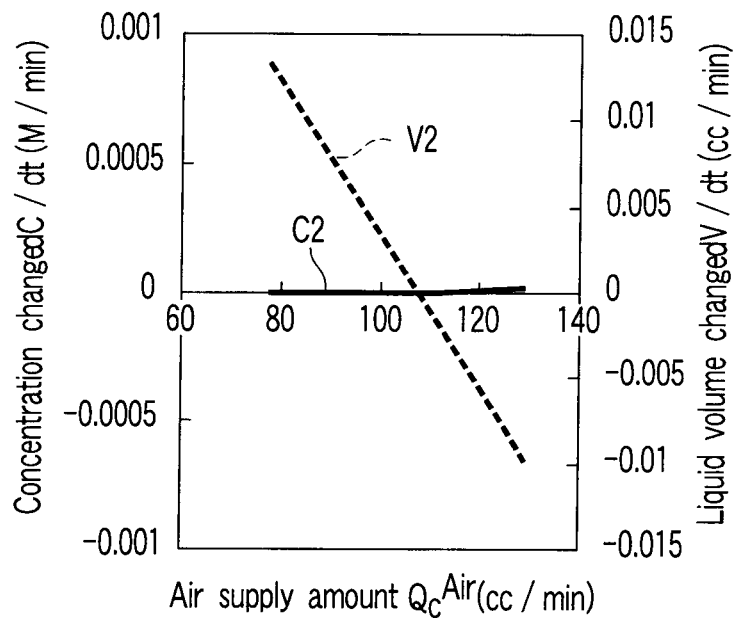
FIG. 8 is a graph showing the relationship between the air supply amount $Q_c^{Air}$, the concentration change $\Delta C$ and the liquid volume change $\Delta V$.

A characteristic curve C2 in FIG. 8 indicates a relation between the air supply amount $Q_c^{Air}$ (cc/min) and the concentration change dC/dt per unit time. Further, a characteristic curve V2 indicates a relation between the air supply amount $Q_c^{Air}$ and the liquid volume change dV/dt per unit time. $Q_c^{Air}$ is the amount of air supplied from the air supply unit 6 to the cathode of the power generation unit 7. At this point, an operation is performed under the condition that the fuel supply unit 3, the fuel circulation unit 5, the power adjustment unit 8 and the power generation unit 7 are at a constant temperature.

When the air supply unit 6 is manipulated to change the amount $Q_c^{Air}$ of air supplied to the power generation unit 7, the concentration change dC/dt per unit time makes little change (characteristic curve C2) as shown in FIG. 8, but the liquid volume change dV/dt per unit time makes a great change (characteristic curve V2). Thus, when the liquid volume sensor 43 has detected that the volume of the mixture fuel in the mixing tank 4 had decreased during operation, the control unit 10 manipulates the air supply unit 6 to reduce the air supply amount $Q_c^{Air}$. On the contrary, when the liquid volume sensor 43 has detected that the volume of the mixture fuel in the mixing tank 4 is increasing, the air supply amount $Q_c^{Air}$ is increased. When the liquid volume sensor 43 has detected that the volume of the mixture fuel in the mixing tank 4 had become normal, the air supply amount $Q_c^{Air}$ is returned to the flow volume for steady operation. If the air supply unit 6 is manipulated in this manner, the volume of the mixture fuel in the mixing tank 4 can be controlled within the proper range.

Furthermore, when the air supply amount $Q_c^{Air}$ is changed, the concentration hardly changes in contrast with the change in the liquid volume, thereby making it possible to construct a system which detects the volume of the mixture fuel to control the liquid volume without controlling the concentration of the mixture fuel.

[Correlation Between Fuel Supply Amount $Q_a^{MeOH}$ and dC/dt, dV/dt]

Figure 9:
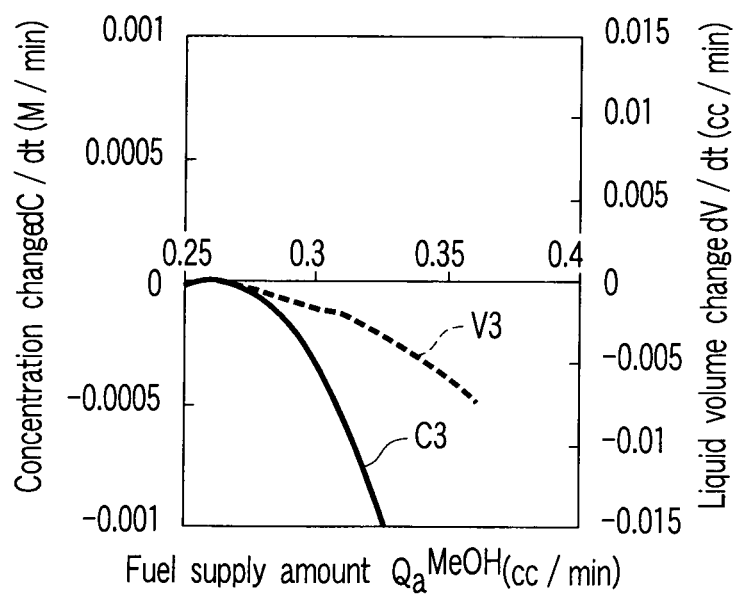
FIG. 9 is a graph showing the relationship between the fuel supply amount $Q_a^{MeOH}$, the concentration change $\Delta C$ and the liquid volume change $\Delta V$.

A characteristic curve C3 in FIG. 9 indicates a relation between the fuel supply amount $Q_a^{MeOH}$ (cc/min) and the concentration change dC/dt per unit time. Further, a characteristic curve V3 indicates a relation between the fuel supply amount $Q_a^{MeOH}$ and the liquid volume change dV/dt per unit time. $Q_a^{MeOH}$ is the amount of the mixture fuel supplied from the fuel circulation unit 5 to the anode of the power generation unit 7. At this point, an operation is performed under the condition that the fuel supply unit 3, the air supply unit 6, the power adjustment unit 8 and the power generation unit 7 are at a constant temperature.

When the fuel circulation unit 5 is manipulated to change the fuel supply amount $Q_a^{MeOH}$, both the concentration change dC/dt per unit time and the liquid volume change dV/dt per unit time decrease (characteristic curves C3, V3) as shown in FIG. 9 if the fuel supply amount $Q_a^{MeOH}$ is increased. Thus, if both the concentration and volume of the mixture fuel have decreased as a result of detecting the concentration and volume of the mixture fuel by the concentration sensor 42 and the liquid volume sensor 43, the fuel supply amount $Q_a^{MeOH}$ is decreased. On the contrary, if both the concentration and volume of the mixture fuel have increased, the fuel supply amount $Q_a^{MeOH}$ is increased. If the fuel circulation unit 5 is manipulated in this manner, the concentration and volume of the mixture fuel in the mixing tank 4 can be controlled within the proper ranges.

[Correlation Between Load Current I and dC/dt, dV/dt]

A characteristic curve C4 in FIG. 10 indicates a relation between the load current I and the concentration change dC/dt per unit time. Further, a characteristic curve V4 indicates a relation between the load current I and the liquid volume change dV/dt per unit time. The load current I is the value of a current taken from the power generation unit 7 out to the load 9 by manipulating the power adjustment unit 8. At this point, an operation is performed under the condition that the fuel supply unit 3, the fuel circulation unit 5, the air supply unit 6 and the power generation unit 7 are at a constant temperature.

If the load current I taken out of the power generation unit 7 by manipulating the power adjustment unit 8 is increased from constant value (1.8 A), both dC/dt and dV/dt decrease (characteristic curves C4, V4) as shown in FIG. 10. Thus, if both the concentration and volume of the mixture fuel have decreased as a result of detecting the concentration and volume of the mixture fuel by the concentration sensor 42 and the liquid volume sensor 43, the load current I is decreased. On the contrary, if both the concentration and volume of the mixture fuel have increased, the load current I is increased. If the power adjustment unit 8 is manipulated in this manner, the concentration and volume of the mixture fuel in the mixing tank 4 can be controlled within the proper ranges.

The rate of changes in dC/dt and dV/dt when the load current I was changed was compared with the rates of changes in dC/dt and dV/dt when the fuel supply amount $Q_{conc}^{MeOH}$, the air supply amount $Q_c^{Air}$, the fuel supply amount $Q_a^{MeOH}$ and the load current I were changed. As a result, the rate for dC/dt was higher than that for dV/dt. Thus, the manipulation of the power adjustment unit 8 makes it possible to construct a system which detects the concentration of the mixture fuel to control the concentration without controlling the volume of the mixture fuel.

[Correlation Between Temperature T of Power Generation Unit and dC/dt, dV/dt]

A characteristic curve C5 in FIG. 11 indicates a relation between the power generation unit temperature T (° C.) and the concentration change dC/dt per unit time. Further, a characteristic curve V5 indicates a relation between the temperature T and the liquid volume change dV/dt per unit time. The temperature T is the temperature of the power generation unit 7 measured by the temperature sensor 72 when it is air-cooled by the fan 71. At this point, an operation is performed under the condition that the operation units (the fuel supply unit 3, the fuel circulation unit 5, the air supply unit 6 and the power adjustment unit 8) other than the fan 71 are at constant values.

When the fan 71 is manipulated to change the temperature T, both dC/dt and dV/dt decrease (characteristic curves C5, V5) as shown in FIG. 11 if the temperature T is raised. Thus, if both the concentration and volume of the mixture fuel have decreased as a result of detecting the concentration and volume of the mixture fuel by the concentration sensor 42 and the liquid volume sensor 43, the temperature T is dropped. On the contrary, if both the concentration and volume of the mixture fuel have increased, the temperature T is raised. If the fan 71 is manipulated in this manner, the concentration and volume of the mixture fuel in the mixing tank 4 can be controlled within the proper ranges.

In the above embodiment, the method has been described in which one of the fuel supply unit 3, the air supply unit 6, the fuel circulation unit 5, the power adjustment unit 8 and the fan 71 is manipulated to control the concentration and volume of the mixture fuel. On the contrary, an alternative method can also be employed in which a combination of the fuel supply unit 3, the fuel circulation unit 5, the power adjustment unit 8 and the fan 71 is manipulated. In such an alternative method, these operation units are combined to allow a wider control domain, for example, when the concentration and the liquid volume are increased/decreased the other way around.

[Control of Concentration and Volume of Mixture Fuel by Air Supply Unit and Fuel Circulation Unit]

Next, there will be described referring to a flowchart in FIG. 12 a method in which the air supply unit 6 and the fuel circulation unit 5 are manipulated to control the concentration and volume of the mixture fuel in the mixing tank 4 in the above fuel cell system 1.

In the present system 1, there are included, during the operation of the power generation unit 7, a step of detecting the concentration of the mixture fuel in the mixing tank 4, and a step of detecting the volume of the mixture fuel. Detected information is processed in the control unit 10 in the following manner.

A schematic configuration of the control unit 10 is shown in FIG. 13. The control unit 10 comprises the control database 30 having various process data, and the processing unit 20 which decides an operation condition from the various detection signals S1, S2 and S3 and the process data and provides the manipulation command signals to the respective operation units (the fuel circulation unit 5, the air supply unit 6, etc.).

As shown in FIG. 13, the control database 30 stores as the process data a table including the correlation data which relates the fuel supply amount $Q_a^{MeOH}$ and the air supply amount $Q_c^{Air}$ with α, β. Further, since α also varies with the power generation unit temperature T and/or the load current I, the control database 30 also stores the correlation data which relates parameters T, I values with a complemented value of α. Moreover, in addition to the above correlation data, the control database 30 also stores data on a time response from the manipulation of the fuel circulation unit 5 and the air supply unit 6 to changes of α, β.

The control unit 10 uses the process data in the control database 30 to calculate output signals to be sent to the fuel circulation unit 5 and the air supply unit 6, and outputs the manipulation command signals to the fuel circulation unit 5 and the air supply unit 6 on the basis of the calculated values.

The concentration detection signal S1 and the liquid volume (level) detection signal S2 of the mixture fuel are sent to the processing unit 20. The processing unit 20 judges the state of the concentration and volume of the mixture fuel from the signals S1 and S2. A method of judging the state of the concentration and volume of the mixture fuel include a method of judging acceptability using threshold values for the respective parameters, or a method in which sampling is performed at regular time intervals to measure the concentration and volume of the mixture fuel in the mixing tank 4, and a judgment is made from variations in the concentration and volume.

The following scheme is employed for the process in which the control unit 10 reads the data from the control database 30 and sends the manipulation command signals to the fuel circulation unit 5 and the air supply unit 6 through the processing unit 20.

Initially, a difference between an upper limit value or a lower limit value in a region within proper ranges of the concentration and volume of the mixture fuel and the detection signals S1 and S2 is obtained, and moreover, ΔC(M) and ΔV(cc) are obtained. Then, the consumption of methanol and water in the power generation unit is changed on the basis of Equations (5) and (6) below.

$$C = \frac{(1+\beta)}{(1+\beta)*\frac{32}{0.79} + (1+6\alpha)*18} \tag{5}$$

$$V = \frac{(1+\beta)}{6F}I*\frac{32}{0.79} + \frac{(1+6\alpha)}{6F}*18I \tag{6}$$

In order to control both the concentration and volume of the mixture fuel, weighting factors $a_1$, $b_1$ are added as necessary as in Equation (7) below so that the control is performed considering both the concentration and volume.

$$f = a_1(D_1-D_0) + b_1(L_1-L_0) \tag{7}$$

Note that $D_0$: a concentration (M) of the mixture fuel consumed in the power generation unit during rated operation $D_1$: a concentration (M) of the mixture fuel consumed in the power generation unit during control operation $L_0$: a consumption speed (cc/s) of the mixture fuel in the power generation unit during rated operation $L_1$: a consumption speed (cc/s) of the mixture fuel in the power generation unit during control operation $a_1$: a weighting factor of the concentration $b_1$: a weighting factor of the consumption speed The concentration $D_0$ and the consumption speed $L_0$ of the mixture fuel are values primarily decided from α, β during rated operation, and have been provided in advance to the control unit 10 of the present control system 1.

For example, when the fuel concentration change ΔC in the mixing tank 4 is a positive value, the control unit 10 selects the parameters α, β from the correlation data in the control database 30 on the basis of Equations (5) and (7) above. The selected αx, β change the concentration of the mixture fuel consumed in the power generation unit 7 from the concentration $D_0$ to the concentration $D_1$ ($D_0 < D_1$). When the parameters α, β are selected, values of the air supply amount $Q_c^{Air}$ and the fuel supply amount $Q_a^{MeOH}$ are primarily decided from the correlation data. The processing unit 20 performs an operation on the basis of the values of $Q_c^{Air}$ and $Q_a^{MeOH}$, and outputs the manipulation command signals S4 and S5 to the air supply unit 6 and the fuel circulation unit 5, respectively. In this way, the present system 1 is operated under control, and the concentration of the mixture fuel consumed in the power generation unit 7 changes from the concentration $D_0$ to concentration $D_1$.

Furthermore, for example, when the liquid volume change ΔV is a positive value, the control unit 10 selects the parameters αx, D from the correlation data in the control database 30 on the basis of Equations (6) and (7) above. The selected α, β change the consumption speed of the mixture fuel in the power generation unit from the consumption speed $L_0$ to the consumption speed $L_1$ ($L_0<L_1$). When the parameters α, β are selected, the values of the air supply amount $Q_c^{Air}$ and the fuel supply amount $Q_a^{MeOH}$ are primarily decided from the correlation data. The processing unit 20 performs an operation on the basis of the values of $Q_c^{Air}$ and $Q_a^{MeOH}$, and outputs the signals S4 and S5 to the air supply unit 6 and the fuel circulation unit 5, respectively. In this way, the present system 1 is operated under control, and the consumption speed of the mixture fuel in the power generation unit 7 changes from the consumption speed $L_0$ during rated operation to the consumption speed $L_1$ during control operation.

Methods of controlling the fuel circulation unit 5 include a method in which the frequency and rotation number of a liquid sending pump are changed, and a method in which, for example, a throttle (orifice) is provided in the fuel circulation unit 5, and pressure loss is provided before and after the throttle to control the flow volume. When an air pump is provided in the air supply unit 6, the frequency and rotation number of the pump are changed. When a fan is provided in the air supply unit 6, the rotation number of the fan is changed. When a throttle (orifice) is provided in the air supply unit 6, throttles can be provided at an entrance and exit of the air supply unit 6 to change the pressure loss.

Figure 12:
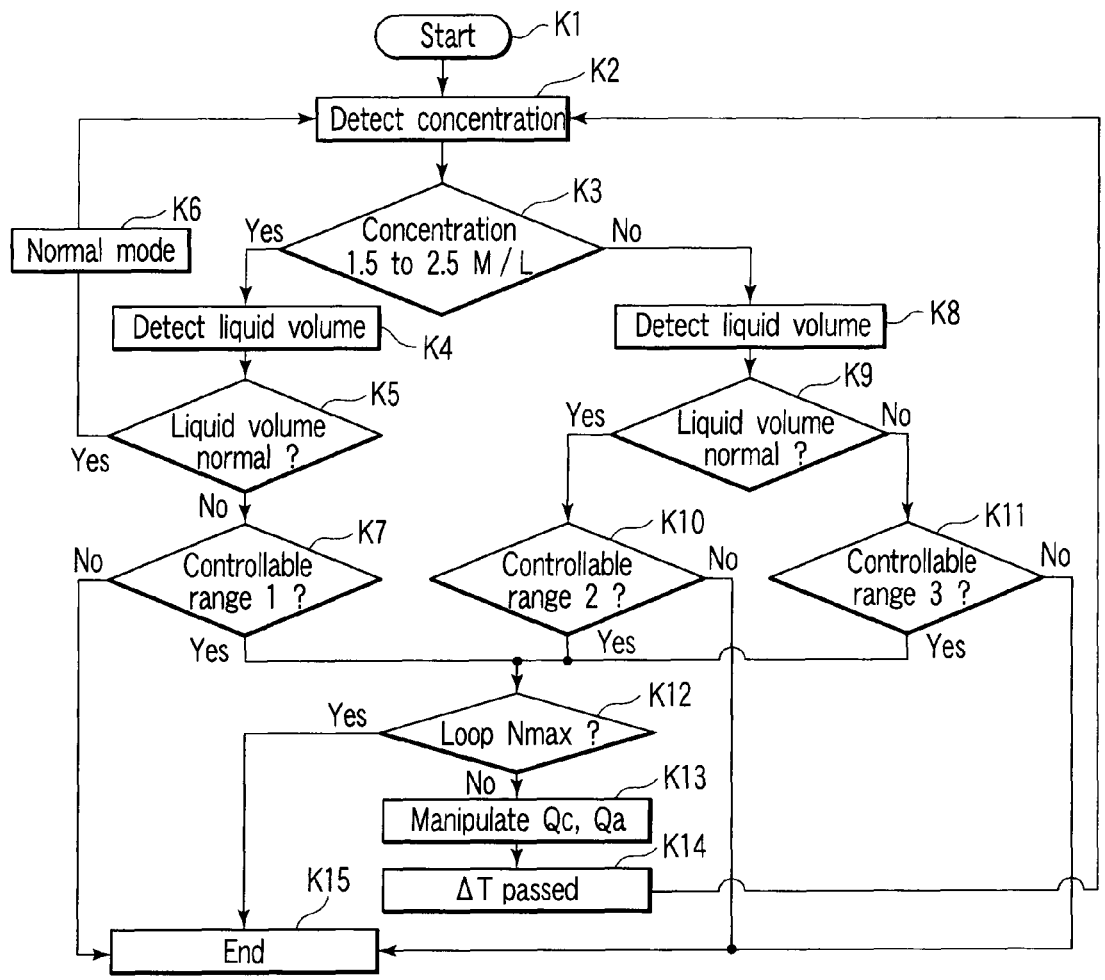
FIG. 12 is a flowchart when the concentration and volume of a fuel are controlled in the embodiment of the present invention.

As shown in FIG. 12, the concentration of the mixture fuel is first detected by the concentration sensor 42, and the processing unit 20 judges whether or not the concentration of the mixture fuel is within a predetermined range. In the present embodiment, the predetermined range is 1.5M to 2.5M which is a region where the output of the power generation unit 7 can keep a certain level or more. The liquid volume sensor 43 detects a volume V of the mixture fuel, and the processing unit 20 judges on the basis of the detected liquid volume V whether or not the volume of the mixture fuel is within a predetermined range. When the volume of the mixture fuel is within the predetermined range, both the concentration and volume of the mixture fuel are within the predetermined ranges, thus maintaining the current air supply amount $Q_c^{Air}$ and fuel supply amount $Q_a^{MeOH}$ (K1→ K2→ K3→ K4→K5→K6).

Next, when the concentration of the mixture fuel is within the predetermined range, the volume of the mixture fuel is detected by the liquid volume sensor 43. When it has been judged that this detected liquid volume is not within the predetermined range, it is judged whether or not the volume of the mixture fuel is controllable (K1→ K2→ K3→ K4→K5→K7) Here, as to whether or not the volume of the mixture fuel is controllable, a predetermined upper limit value and lower limit value are preset, and the detected liquid volume is judged to be controllable when it is within a range from the upper limit value to the lower limit value, while the detected liquid volume is judged to be uncontrollable when it is out of this range. When the detected liquid volume has been judged to be uncontrollable, processing is terminated (K7→K15).

When the detected liquid volume has been judged to be controllable, the control unit 10 selects the parameters α, β, and decides the value of the air supply amount $Q_c^{Air}$ and the value of the fuel supply amount $Q_a^{MeOH}$ which will be the selected parameters α, β, and then outputs, on the basis of these values, the signals S4 and S5 to the air supply unit 6 and the fuel circulation unit 5, respectively. This restrains the variation from the concentration $D_0$ (during rated operation) to the concentration $D_1$ (during control operation) of the mixture fuel (a decrease in an absolute value $|D_1-D_0|$), and increases the variation from the consumption speed $L_0$ (during rated operation) to the consumption speed $L_1$ (during control operation) of the mixture fuel (an increase in an absolute value $|L_1-L_0|$).

After a predetermined time ΔT has passed from the output of the manipulation command signals S4 and S5, if the volume of the mixture fuel is within a predetermined target range, the air supply amount $Q_c^{Air}$ and the fuel supply amount $Q_a^{MeOH}$ are brought to the values during rated operation, and on the basis of these values, the signals S4 and S5 are output to the fuel circulation unit 5 and the air supply unit 6, respectively (K7→K12→K13→K14→K2→K3→K4→K5→K6). Further, when the volume of the mixture fuel is not within the predetermined range even after the predetermined time ΔT has passed, a control loop is repeated until the volume falls within the predetermined range. However, the volume of the mixture fuel does not fall within the predetermined range even if the control loop is repeated N times, processing of the control loop is terminated (K7→K12→ K13→ K14→ K2→K3→K4→K5→K7→K12→K15).

When the concentration of the mixture fuel is not within the predetermined range, the volume of the mixture fuel is then detected, and the processing unit 20 judges whether or not the volume of the mixture fuel is within the predetermined range. Then, when the volume of the mixture fuel is within the predetermined range, the concentration of the mixture fuel is abnormal, so that it is judged whether or not the concentration of the mixture fuel is controllable (K1→ K2→ K3→K8→K9→K10). Here, when the concentration of the mixture fuel is within a controllable range, the concentration of the mixture fuel is in a region (region between the predetermined upper limit value and lower limit value) of the concentration of the mixture fuel where the power generation unit 7 can generate power. In the present embodiment, a range from a lower limit value 1.0M to an upper limit value 3.0M is judged to be controllable. On the other hand, when the concentration of the mixture fuel is out of this range, it is judged to be uncontrollable. When it has been judged to be uncontrollable, the operation is terminated (K10→K15).

When the concentration has been judged to be uncontrollable, the control unit 10 selects the parameters α, β which increase the variation from the concentration $D_0$ to the concentration $D_1$ of the mixture fuel and which restrain the variation from the consumption speed $L_1$ to the consumption speed $L_1$ of the mixture fuel, and decides the values of the air supply amount $Q_c^{Air}$ and the fuel supply amount $Q_a^{MeOH}$ which will be the selected parameters α, β, and then outputs, on the basis of these values, the manipulation command signals S4 and S5 to the air supply unit 6 and the fuel circulation unit 5, respectively. Further, when the concentration of the mixture fuel is within the predetermined range after the predetermined time ΔT has passed from the output of the manipulation command signals, the air supply amount $Q_c^{Air}$ and the fuel supply amount $Q_a^{MeOH}$ are brought to the values during rated operation, and, on the basis of these values, the manipulation signals are output to the fuel circulation unit 5 and the air supply unit 6 (K10→ K12→K13→ K14→K2→ K3→K4→ K5→ K6). Further, when the concentration of the mixture fuel does not fall within the predetermined range even after the predetermined time ΔT has passed, the control loop is repeated. However, when the concentration of the mixture fuel does not fall within the predetermined range even if the control loop is repeated N times, the processing of the control loop is terminated (K10→K12→K13→ K14→K2→ K3→K8→ K9→ K10→K12→K15).

When the processing unit 20 has judged that the concentration of the mixture fuel is not within the predetermined range and that the volume thereof is not within the predetermined range either, it moves to a procedure of controlling the concentration and volume of the mixture fuel. Further, it is judged whether or not the concentration and volume of the mixture fuel are controllable (K1→K2→ K3→K8→K9→K11. Here, when the concentration of the mixture fuel is within a controllable range, the concentration of the mixture fuel is in a region (region between the predetermined upper limit value and lower limit value) of the concentration of the mixture fuel where the power generation unit 7 can generate power. In the present embodiment, it is judged that a range from a lower limit value 1.0M to an upper limit value 3.0M is controllable. On the other hand, when the concentration of the mixture fuel is out of this range, it is judged to be uncontrollable. When it has been judged to be uncontrollable, the operation is terminated (K11→K15).

When the concentration has been judged to be controllable, the control unit 10 adds the weighting factor $a_1$ of the change from the concentration $D_0$ to the concentration $D_1$ to decide the concentration $D_1$ of the mixture fuel, and adds the weighting factor $b_1$ of the change from the consumption speed $L_0$ to the consumption speed $L_1$ to decide the consumption speed $L_1$ the mixture fuel. Then, the control unit 10 selects α, β corresponding to the above, and decides the values of the air supply amount $Q_c^{Air}$ and the fuel supply amount $Q_a^{MeOH}$ which will be the selected α, β, and then outputs, on the basis of these values, the manipulation command signals to the air supply unit 6 and the fuel circulation unit 5. Further, when the volume and concentration of the mixture fuel are within the predetermined ranges after the predetermined time ΔT has passed from the output of the manipulation command signals, the air supply amount $Q_c^{Air}$ and the fuel supply amount $Q_a^{MeOH}$ are brought to the values during rated operation, and, on the basis of these values, the manipulation signals are output to the fuel circulation unit 5 and the air supply unit 6 (K11→K12→K13→K14→K2→K3→K4→K5→K6). Further, when the concentration and volume of the mixture fuel do not fall within the predetermined ranges even after the predetermined time ΔT has passed, the control loop is repeated. However, when the concentration and volume of the mixture fuel do not fall within the predetermined ranges even if the control loop is repeated N times, the processing of the control loop is terminated (K11→K12→K13→ K14→K2→K3→K8→K9→K11→K12→K15).

In connection with the fuel cell system and the method of controlling the fuel cell system according to the present embodiment which have been achieved in the above manner, if control contents of the control unit 10 are individually viewed, the fuel circulation unit 5 is controlled to change the fuel supply amount $Q_a^{MeOH}$ so that the crossover amounts of methanol and water are changed (FIG. 4), thereby making it possible to control both the concentration and volume of the mixture fuel consumed in the power generation unit 7 (FIG. 9).

Furthermore, the air supply unit 6 is controlled to change the air supply amount $Q_c^{Air}$ so that the crossover amounts of methanol and water are changed (FIG. 3), thereby making it possible to control the volume of the mixture fuel consumed in the power generation unit 7 (FIG. 8).

Second Embodiment

Next, a second embodiment of the present invention will be described.

In the second embodiment, a fuel circulation unit 5 or an air supply unit 6 is controlled to adjust the concentration and volume of a mixture fuel, and a power adjustment unit 8 is controlled to change a load current I.

When the power adjustment unit 8 is controlled, a concentration change dC/dt per unit time can be much greater than a liquid volume change dV/dt per unit time as shown in FIG. 10. On the other hand, when the air supply unit 6 is controlled, the concentration change dC/dt per unit time is very small as compared with the liquid volume change dV/dt per unit time as shown in FIG. 8. Therefore, while the fuel circulation unit 5 and the air supply unit 6 are controlled, the load current I is controlled in the power adjustment unit 8.

It is to be noted that conditions for the power adjustment unit 8 to control the load current I are (1) and (2) below.

(1) A case where it has been judged that a concentration C and a liquid volume V of the mixture fuel can not be controlled within predetermined ranges by controlling a fuel supply amount $Q_a^{MeOH}$ and an air supply amount $Q_c^{Air}$ without considering the load current I.

(2) A case where both ΔC and ΔV have decreased or increased under the condition (1) above.

In a fuel cell system 1 shown in FIG. 1, the power adjustment unit 8 is connected with a control unit 10 to control the load current I taken from a power generation unit 7 and supplied to a load 9. That is, the control unit 10 can control the load current I by outputting a manipulation signal S8 to the power adjustment unit 8. Regarding a range of control of the load current I, in order to prevent an anode side from being short of a fuel and prevent en electrode from having its polarity inverted, a current in a region where there is the fuel supply amount $Q_a^{MeOH}$ necessary for power generation is set as a maximum load current value $I^{max}(A)$, so that a change is made in a region below the load current I to satisfy Equation (8) below.

$$I^{max}(A) < Q_a^{MeOH} \frac{6FC}{1000} \quad (8)$$

Note that the fuel supply amount $Q_a^{MeOH}$ is a fuel supply amount (cc/min) of the mixture fuel supplied to the anode, F is Faraday constant, and C is a concentration (M) of the mixture fuel. The amount of the fuel supplied from a highly concentrated fuel tank 2 to a mixing tank 4 is constant in the same flow volume as that under the condition in the first embodiment.

Figure 14:
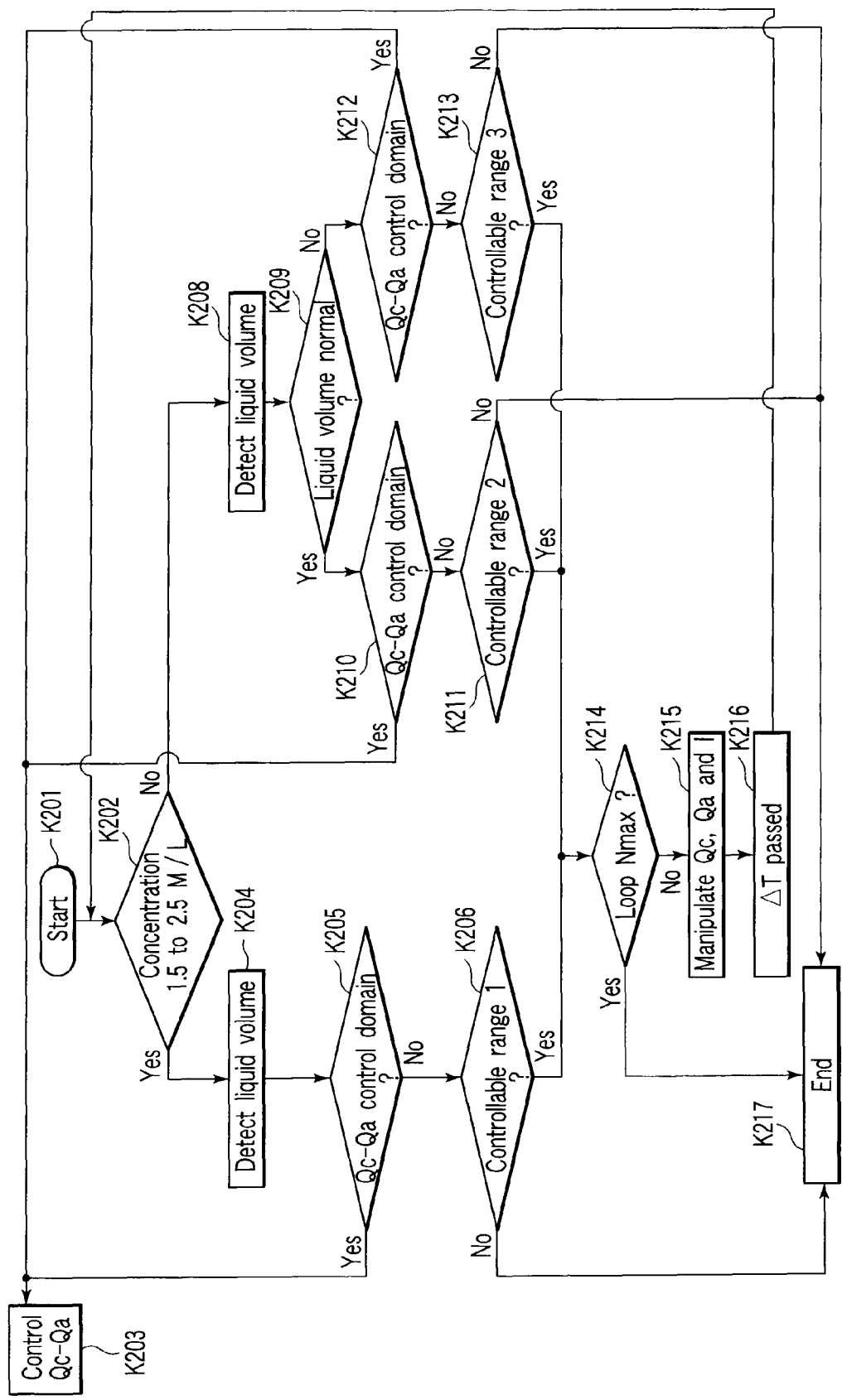
FIG. 14 is a flowchart when the concentration and volume of a fuel are controlled in another embodiment.

A control flowchart of the present embodiment is shown in FIG. 14. Initially, a concentration sensor 42 is used to detect the concentration of the mixture fuel, and a processing unit 20 judges whether or not the concentration of the mixture fuel is within a predetermined range. In the present embodiment, the predetermined range is 1.5M to 2.5M which is a region where the output of the power generation unit 7 can keep a certain level or more. Here, when the concentration of the mixture fuel is within the predetermined range, a liquid volume sensor 43 is used to detect the volume of the mixture fuel, thus judging whether or not the volume of the mixture fuel can be controlled with the air supply amount $Q_c^{Air}$ and the fuel supply amount $Q_a^{MeOH}$ (K202→K204→K205). Here, as to whether or not the volume of the mixture fuel is controllable, a predetermined upper limit value and lower limit value are preset, and the volume can be judged to be controllable when it is below the upper limit value or above the lower limit value, while the volume can be judged to be uncontrollable when it is above the upper limit value or below the lower limit value.

When it has been judged that the volume of the mixture fuel can be controlled with the air supply amount $Q_c^{Air}$ and the fuel supply amount $Q_a^{MeOH}$, the volume of the mixture fuel can be controlled with the air supply amount $Q_c^{Air}$ and the fuel supply amount $Q_a^{MeOH}$, thus moving to control by the air supply amount $Q_c^{Air}$ and the fuel supply amount $Q_a^{MeOH}$, for example, control shown in FIG. 12 (K205→K203). On the other hand, when the volume of the mixture fuel has been judged to be uncontrollable, it is then judged whether or not the volume can be controlled with the air supply amount $Q_c^{Air}$, the fuel supply amount $Q_a^{MeOH}$ and the load current I. Here, as to whether or not the volume of the mixture fuel is controllable, a predetermined upper limit value and lower limit value are preset, and the detected liquid volume is judged to be controllable when it is within a range from the upper limit value to the lower limit value, while the detected liquid volume is judged to be uncontrollable when it is out of this range. When the detected liquid volume has been judged to be uncontrollable, processing is terminated (K205→K206→K217).

When the detected liquid volume has been judged to be controllable, the current judgment contains a situation where the concentration of the mixture fuel is normal and the volume of the mixture fuel can not be controlled with the air supply amount $Q_c^{Air}$ and the fuel supply amount $Q_a^{MeOH}$ but can be controlled with the air supply amount $Q_c^{Air}$, the fuel supply amount $Q_a^{MeOH}$ and the load current I, thus moving to step K215 of controlling the air supply amount $Q_c^{Air}$, the fuel supply amount $Q_a^{MeOH}$ and the load current I (K206→K214→K215). The manipulated variables of the fuel circulation unit 5, the air supply unit 6 and the power adjustment unit 8 are controlled to adjust $Q_c^{Air}$, $Q_a^{MeOH}$ and the load current I, and a control loop operation of steps K215→K216→K202→K204→K205→K206→K214 is performed. Then, when the volume of the mixture fuel does not become normal even if the control loop operation to manipulate the fuel circulation unit 5, the air supply unit 6 and the power adjustment unit 8 is performed a certain number of times or more, the control loop is escaped to terminate the processing (K214→K217; time limited).

Specifically, the control unit 10 selects parameters α, β from correlation data in a control database 30 when it has been judged that the concentration C of the mixture fuel is proper and that the volume V of the mixture fuel can not be controlled by the manipulation of the air supply amount $Q_c^{Air}$ and the fuel supply amount $Q_a^{MeOH}$ but it can be controlled by the manipulation of the air supply amount $Q_c^{Air}$, the fuel supply amount $Q_a^{MeOH}$ and the load current I. Regarding the selected α, β, a difference between a concentration $D_1$ (during control operation) and a concentration $D_0$ (during rated operation) is narrowed down (a decrease in an absolute value $|D_1 - D_0|$), and a difference between a consumption speed $L_1$ (during control operation) and a consumption speed $L_0$ (during rated operation) is widened (an increase in an absolute value $|L_1 - L_0|$) so that the concentration of the mixture fuel consumed in the power generation unit 7 falls within a range from 1.5M to 2.5M.

The control unit 10 decides the value of the air supply amount $Q_c^{Air}$, the value of the fuel supply amount $Q_a^{MeOH}$ and the value of the load current I from the selected α, β, and outputs, on the basis of these values, manipulation command signals S5, S4 and S8 to the air supply unit 6, the fuel circulation unit 5 and the power adjustment unit 8. When the volume V of the mixture fuel is within the predetermined range after a predetermined time ΔT has passed from the output of the manipulation command signals, the manipulation signals S5, S4 and S8 are output to the air supply unit 6, the fuel circulation unit 5 and the power adjustment unit 8 to return the values of the air supply amount $Q_c^{Air}$, the fuel supply amount $Q_a^{MeOH}$ and the load current I to the values during rated operation (K203→K1→ K2→K3→ K4→K5→K6). Further, when the volume of the mixture fuel does not fall within the predetermined range even after the predetermined time ΔT has passed, the loop is repeated until the volume falls within the predetermined range. However, when the volume of the mixture fuel does not fall within the predetermined range even if the loop is repeated N times, the processing of the control loop is terminated (K206→K214→K217).

In addition, when it has been judged that the concentration of the mixture fuel is normal and the volume of the mixture fuel can be controlled with the air supply amount $Q_c^{Air}$ and the fuel supply amount $Q_a^{MeOH}$, the control unit 10 manipulates the fuel circulation unit 5 and the air supply unit 6, and thus performs the control loop operation shown in FIG. 12 to control the concentration C and the volume V (K203). When it has been judged that the concentration of the mixture fuel is normal and that the volume of the mixture fuel can not be controlled with the air supply amount $Q_c^{Air}$ and the fuel supply amount $Q_a^{MeOH}$ but can be controlled with the air supply amount $Q_c^{Air}$, the fuel supply amount $Q_a^{MeOH}$ and the load current I, the control unit 10 again manipulates the fuel circulation unit 5, the air supply unit 6 and the power adjustment unit 8 to control the volume V while holding the concentration C within a proper range.

Furthermore, when the concentration of the mixture fuel is not within the predetermined range, the volume of the mixture fuel is then detected, and the processing unit 20 judges whether or not the volume of the mixture fuel is within the predetermined range. When the volume of the mixture fuel is within the predetermined range, it is judged whether or not the volume can be controlled with the air supply amount $Q_c^{Air}$ and the fuel supply amount $Q_a^{MeOH}$ (K202→ K208→ K209→K210).

In the present embodiment, the concentration of the mixture fuel can be judged to be controllable when it is within a range above the lower limit value 1.0M and below the upper limit value 3.0M, while the concentration can be judged to be uncontrollable when it is out of this range. When the volume of the mixture fuel can be controlled with the air supply amount $Q_c^{Air}$ and the fuel supply amount $Q_a^{MeOH}$, it can be controlled with the air supply amount $Q_c^{Air}$ and the fuel supply amount $Q_a^{MeOH}$, thus moving to control by the air supply amount $Q_c^{Air}$ and the fuel supply amount $Q_a^{MeOH}$, for example, control shown in FIG. 12 (K203).

On the other hand, when the volume of the mixture fuel has been judged to be uncontrollable, it is then judged whether or not the volume can be controlled with the air supply amount $Q_c^{Air}$, the fuel supply amount $Q_a^{MeOH}$ and the load current I (K210→K211). Here, as to whether or not the volume of the mixture fuel is controllable, a predetermined upper limit value and lower limit value are preset, and the volume can be judged to be controllable when it is within a range below the upper limit value and above the lower limit value, while the volume can be judged to be uncontrollable when it is out of this range. When the volume has been judged to be uncontrollable, processing is terminated (K211→K217).

When the volume has been judged to be controllable, the current judgment contains a situation where the concentration of the mixture fuel is not within the predetermined range and the volume V of the mixture fuel can not be controlled with the air supply amount $Q_c^{Air}$ and the fuel supply amount $Q_a^{MeOH}$ but can be controlled with the air supply amount $Q_c^{Air}$, the fuel supply amount $Q_a^{MeOH}$ and the load current I, thus moving to step K215 of controlling the air supply amount $Q_c^{Air}$, the fuel supply amount $Q_a^{MeOH}$ and the load current I (K211→K214→K215). The manipulated variables of the fuel circulation unit 5, the air supply unit 6 and the power adjustment unit 8 are controlled to adjust $Q_c^{Air}$, $Q_a^{MeOH}$ and the load current I, and a control loop operation of steps K215→K216→K202→K208→K209→K210→K211→K214 is performed. Then, when the volume of the mixture fuel does not become normal even if the control loop operation to manipulate the fuel circulation unit 5, the air supply unit 6 and the power adjustment unit 8 is performed a certain number of times or more, the control loop is escaped to terminate the processing (K214→K217; time limited).

Specifically, the control unit 10 selects α, β as in the first embodiment when it has been judged that the concentration C of the mixture fuel is not within the predetermined range and that the volume V of the mixture fuel can not be controlled with the air supply amount $Q_c^{Air}$ and the fuel supply amount $Q_a^{MeOH}$ but it can be controlled with the air supply amount $Q_c^{Air}$, the fuel supply amount $Q_a^{MeOH}$ and the load current I. By use of the selected α, β, the control unit 10 increases a change from the concentration $D_0$ to the concentration $D_1$ of the mixture fuel consumed in the power generation unit 7 so that the concentration C of the mixture falls within the predetermined range from 1.5M to 2.5M, and restrains a change from the consumption speed $L_0$ to the consumption speed $L_1$ of the mixture fuel. That is, the value of the air supply amount $Q_c^{Air}$, the value of the fuel supply amount $Q_a^{MeOH}$ and the value of the load current I which will be the selected α, β are decided, and on the basis of these values, the manipulation command signals S5, S4 and S8 are output to the air supply unit 6, the fuel circulation unit 5 and the power adjustment unit 8.

When the concentration C of the mixture fuel is within the predetermined range after the predetermined time ΔT has passed from the output of the manipulation command signals, the control unit 10 outputs the manipulation signals S5, S4 and S8 to the air supply unit 6, the fuel circulation unit 5 and the power adjustment unit 8 to return the air supply amount $Q_c^{Air}$, the fuel supply amount $Q_a^{MeOH}$ and the load current I to the values during rated operation (K203→ K1→K2→K3→K4→K5→K6). Further, when the concentration C of the mixture fuel does not fall within the predetermined range even after the predetermined time ΔT has passed, the loop is repeated until the concentration C falls within the predetermined range. However, when the concentration of the mixture fuel does not fall within the predetermined range even if the loop is repeated N times, the loop is terminated (K211→K214→K217).

In addition, when it has been judged that the concentration of the mixture fuel is normal and the volume of the mixture fuel can be controlled with the air supply amount $Q_c^{Air}$ and the fuel supply amount $Q_a^{MeOH}$, the control unit 10 manipulates the fuel circulation unit 5 and the air supply unit 6, and thus performs the control loop operation shown in FIG. 12 to control the concentration C and the volume V (K203). When it has been judged that the concentration of the mixture fuel is normal and that the volume of the mixture fuel can not be controlled with the air supply amount $Q_c^{Air}$ and the fuel supply amount $Q_a^{MeOH}$ but can be controlled with the air supply amount $Q_c^{Air}$, the fuel supply amount $Q_a^{MeOH}$ and the load current I, the control unit 10 again manipulates the fuel circulation unit 5, the air supply unit 6 and the power adjustment unit 8 to control the concentration C while holding the volume V within a proper range.

When the processing unit 20 has judged that the concentration of the mixture fuel is not within the predetermined range and that the volume thereof is not within the predetermined range either, it judges whether or not they can be controlled with the air supply amount $Q_c^{Air}$ and the fuel supply amount $Q_a^{MeOH}$ (K204→K208→K209→K212).

In the present embodiment, the concentration of the mixture fuel can be judged to be controllable when it is within a range above the lower limit value 1.0M and below the upper limit value 3.0M, while the concentration can be judged to be uncontrollable when it is out of this range. When it has been judged that the volume of the mixture fuel can be controlled with the air supply amount $Q_c^{Air}$ and the fuel supply amount $Q_a^{MeOH}$, it can be controlled with the air supply amount $Q_c^{Air}$ and the fuel supply amount $Q_a^{MeOH}$, thus moving to control by the air supply amount $Q_c^{Air}$ and the fuel supply amount $Q_a^{MeOH}$, for example, control shown in FIG. 12 (K212→K203).

On the other hand, when the volume of the mixture fuel has been judged to be uncontrollable, it is then judged whether or not the volume can be controlled by the manipulation of the air supply amount $Q_c^{Air}$, the fuel supply amount $Q_a^{MeOH}$ and the load current I (K212→K213). Here, as to whether or not the volume of the mixture fuel is controllable, a predetermined upper limit value and lower limit value are preset, and the volume can be judged to be controllable when it is within a range from the upper limit value to the lower limit value, while the volume can be judged to be uncontrollable when it is out of this range. When the volume has been judged to be uncontrollable, processing is terminated (K213→K217).

When the volume has been judged to be controllable, a transition is made to step K215 of controlling the air supply amount $Q_c^{Air}$, the fuel supply amount $Q_a^{MeOH}$ and the load current I (K213→K214→K215). The manipulated variables of the fuel circulation unit 5, the air supply unit 6 and the power adjustment unit 8 are controlled to adjust $Q_c^{Air}$, $Q_a^{MeOH}$ and the load current I, and a control loop operation of steps K214→K215→K216→ K202→K208→K209→K212→ K213→K214 is performed. Then, when the volume of the mixture fuel does not become normal even if the control loop operation to manipulate the fuel circulation unit 5, the air supply unit 6 and the power adjustment unit 8 is performed a certain number of times or more, the control loop is escaped to terminate the processing (K214→K217; time limited).

Specifically, when it has been judged that both the concentration and volume of the mixture fuel are not within the predetermined ranges, and that the volume of the mixture fuel can not be controlled with the air supply amount $Q_c^{Air}$ and the fuel supply amount $Q_a^{MeOH}$ but it can be controlled with the air supply amount $Q_c^{Air}$, the fuel supply amount $Q_a^{MeOH}$ and the load current I, weighting factors $a_1$, $b_1$ are added to the change from the concentration $D_0$ to the concentration $D_1$ of the mixture fuel consumed in the power generation unit 7 and to the change from the consumption speed $L_0$ to the consumption speed $L_1$ of the mixture fuel in the power generation unit 7, thereby deciding the concentration $D_1$ of the mixture fuel and the consumption speed $L_1$ of the mixture fuel.

The control unit 10 selects α, β corresponding to $D_1$ and $L_1$, and decides the values of the air supply amount $Q_c^{Air}$, the fuel supply amount $Q_a^{MeOH}$ and the load current I which will be the selected parameters α, β, and then outputs, on the basis of these values, the manipulation command signals S5, S4 and S8 to the air supply unit 6, the fuel circulation unit 5 and the power adjustment unit 8. When the volume C and the concentration V of the mixture fuel are within the predetermined ranges after the predetermined time ΔT has passed from the output of the manipulation command signals, the control unit 10 outputs the manipulation signals S5, S4 and S8 to the air supply unit 6, the fuel circulation unit 5 and the power adjustment unit 8 to return the values of the air supply amount $Q_c^{Air}$ and the fuel supply amount $Q_a^{MeOH}$ to the values during rated operation (K214→K215→K216→ K202→K204→ K205→ K203).

Furthermore, when the concentration C and the volume V of the mixture fuel do not fall within the predetermined ranges even after the predetermined time ΔT has passed, the control loop is repeated until they fall within the predetermined ranges. However, when the concentration C and the volume V of the mixture fuel do not fall within the predetermined ranges even if the loop is repeated N times, the loop is terminated (K212→K213→K214  K215→K216→K202→  K208→ K209→ K212→K213→K214→K217).

In addition, when it has been judged that the concentration of the mixture fuel is normal and the volume of the mixture fuel can be controlled with the air supply amount $Q_c^{Air}$ and the fuel supply amount $Q_a^{MeOH}$, the control unit 10 manipulates the fuel circulation unit 5 and the air supply unit 6, and thus performs the control loop operation shown in FIG. 12 to control the concentration C and the volume V (K203). When it has been judged that the concentration of the mixture fuel is normal and that the volume of the mixture fuel can not be controlled with the air supply amount $Q_c^{Air}$ and the fuel supply amount $Q_a^{MeOH}$ but can be controlled with the air supply amount $Q_c^{Air}$, the fuel supply amount $Q_a^{MeOH}$ and the load current I, the control unit 10 again manipulates the fuel circulation unit 5, the air supply unit 6 and the power adjustment unit 8 to control the volume V and the concentration C.

According to the present embodiment, not only $Q_c^{Air}$ and $Q_a^{MeOH}$ but also the load current I is added to control targets, control domains of the concentration and volume are further expanded.

Third Embodiment

Next, a third embodiment of the present invention will be described.

In the third embodiment, a fuel circulation unit 5 or an air supply unit 6 is controlled to adjust a concentration C and volume V of a mixture fuel, and moreover, a highly concentrated fuel supply unit 3 is controlled to change a fuel supply amount $Q_{conc}^{MeOH}$.

In the process of adjusting the concentration of the mixture fuel, when the concentration of the mixture fuel is lower than a predetermined concentration (e.g., 1.5M), the fuel circulation unit 5 is controlled to adjust a fuel supply amount $Q_a^{MeOH}$, and methanol sufficient for power generation is not supplied to a catalyst layer on an anode side of a power generation unit 7, so that a power generation voltage of the power generation unit 7 tends to decrease. On the other hand, when the concentration of the mixture fuel is higher than a predetermined concentration (e.g., 2.5M), excessive methanol for the power generation is supplied to the catalyst layer on the anode side of the power generation unit 7, so that β increases and the power generation voltage of the power generation unit 7 tends to decrease. Moreover, if the concentration of the mixture fuel becomes still higher, the life of the power generation unit 7 may be significantly shortened. The value of the concentration changes depending on the kind of catalyst used in the power generation unit 7 and the configuration of electrodes. Therefore, while the fuel circulation unit 5 and the air supply unit 6 are controlled, the fuel supply amount $Q_{conc}^{MeOH}$ is controlled by the fuel supply unit 3.

It is to be noted that conditions for controlling the fuel supply amount $Q_{conc}^{MeOH}$ are (a) and (b) below.

(a) A case where the concentration of the mixture fuel is blow the predetermined concentration, and the volume of the mixture fuel in a mixing tank is at a degree that can increase the supply amount of a raw fuel or a highly concentrated fuel.

(b) A case where the concentration of the mixture fuel is above the predetermined concentration, and the volume of the mixture fuel in the mixing tank is at a degree that can stop the supply or decrease the supply amount of the raw fuel or the highly concentrated fuel.

Figure 15:
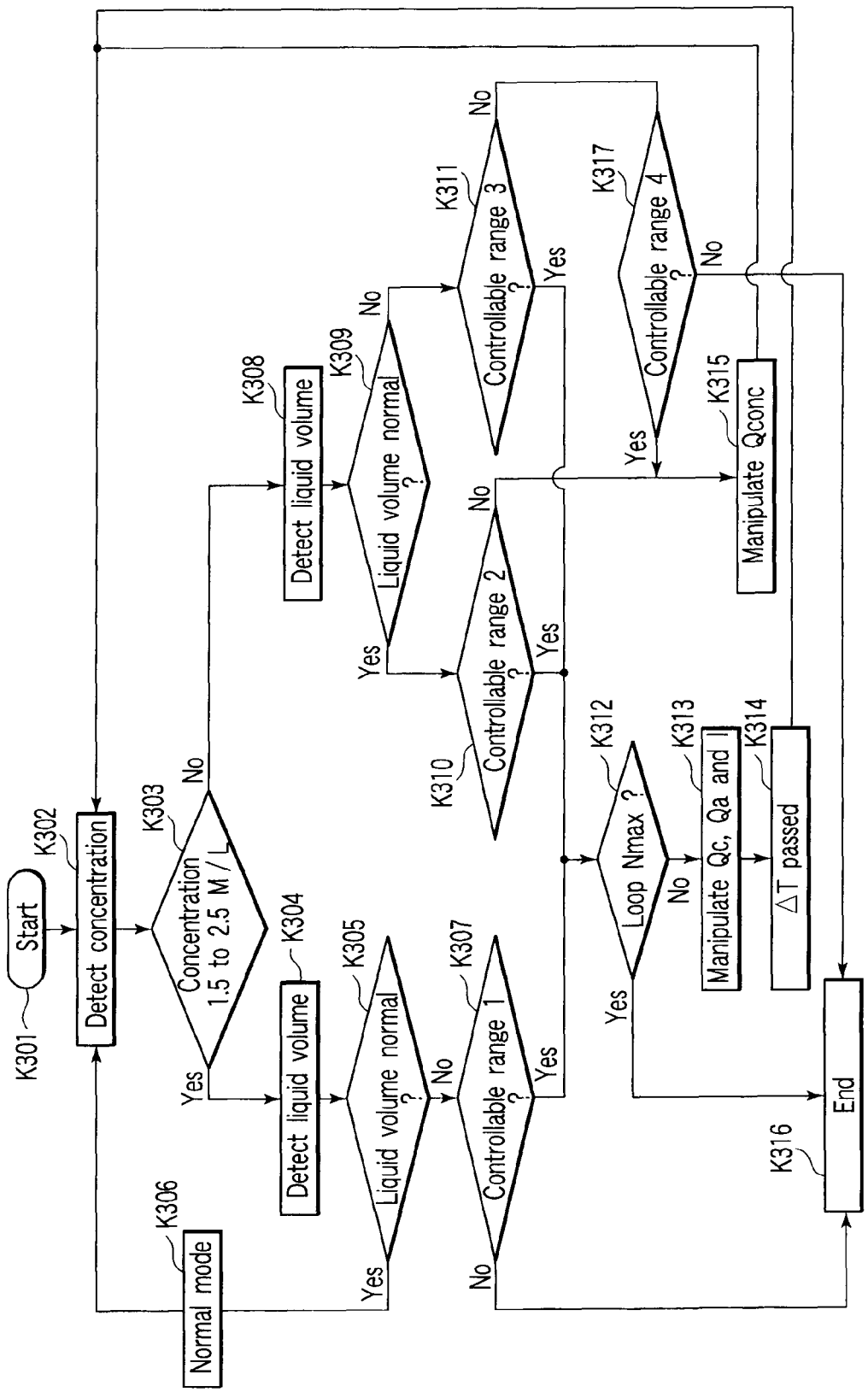
FIG. 15 is a flowchart when the concentration and volume of a fuel are controlled in another embodiment.

A control flowchart of the present embodiment is shown in FIG. 15. Initially, a concentration sensor 42 is used to detect the concentration of the mixture fuel, and a processing unit 20 judges whether or not the concentration of the mixture fuel is within a predetermined range. In the present embodiment, the predetermined range is 1.5M to 2.5M which is a region where the output of the power generation unit 7 can keep a certain level or more. Here, when the concentration of the mixture fuel is within the predetermined range, a liquid volume sensor 43 is used to detect the volume of the mixture fuel, and the processing unit 20 thus judges whether or not the volume V of the mixture fuel is within the predetermined range. When the volume V is within the predetermined range, both the concentration and volume of the mixture fuel are within the predetermined ranges as in the first embodiment, so that the current air supply amount $Q_c^{Air}$ and fuel supply amount $Q_a^{MeOH}$ are maintained (K301→K302→ K303→ K304→ K305→K306).

In a case where the concentration of the mixture fuel is within the predetermined range, if it has been judged that the volume of the mixture fuel is not within the predetermined range as a result of detecting the volume of the mixture fuel, it is judged as in the first embodiment whether or not the volume of the mixture fuel is controllable (K301→K302 K303→K304→K305→K307) When the volume is judged to be uncontrollable, processing is terminated (K307→K316).

When the volume is judged to be controllable, the control unit 10, as in the first embodiment described above, selects α, β, and decides the value of the air supply amount $Q_c^{Air}$ and the value of the fuel supply amount $Q_a^{MeOH}$ from the selected α, β, and then outputs, on the basis of these values, manipulation command signals S5 and S4 to the air supply unit 6 and the fuel circulation unit 5, respectively.

When the volume of the mixture fuel is within the predetermined range after a predetermined time ΔT has passed from the output of the manipulation command signals, the control unit 10 outputs the manipulation signals S4 and S5 to the fuel circulation unit 5 and the air supply unit 6, respectively, to return the air supply amount $Q_c^{Air}$ and the fuel supply amount $Q_a^{MeOH}$ to values during rated operation (K307→K312→K313→K314→K302→K303→K304→ K305→K306).

Furthermore, when the volume V of the mixture fuel does not fall within the predetermined range even after the predetermined time ΔT has passed, the control loop is repeated until the volume V falls within the predetermined range. When the volume of the mixture fuel does not fall within the predetermined range even if the loop is repeated N times, the loop is terminated (K307→K312→ K313→K314→ K302→K303→K304→K305→K307→K312→K316).

When the concentration of the mixture fuel is not within the predetermined range, the control unit 10 detects the volume of the mixture fuel, and judges whether or not the volume of the mixture fuel is within the predetermined range. When the volume of the mixture fuel is within the predetermined range, the control unit 10 judges whether or not the concentration of the mixture fuel is controllable (K301→ K302→ K303→K308→K309→K310).

When the concentration is judged to be controllable, the control unit 10, as in the first embodiment, selects α, β, and decides the values of the air supply amount $Q_c^{Air}$ and the fuel supply amount $Q_a^{MeOH}$ from the selected α, β, and then outputs the manipulation command signals S5 and S4 to the air supply unit 6 and the fuel circulation unit 5, respectively. Then, when the concentration of the mixture fuel is within the predetermined range after the predetermined time ΔT has passed from the output of the manipulation command signals, the control unit 10 outputs the manipulation signals S4 and S5 to the fuel circulation unit 5 and the air supply unit 6, respectively, to return the air supply amount $Q_c^{Air}$ and the fuel supply amount $Q_a^{MeOH}$ to the values during rated operation (K310→K312→K313→K314→K302→K303→K304→K305→K306).

Furthermore, when the concentration C of the mixture fuel does not fall within the predetermined range even after the predetermined time ΔT has passed, the control loop is repeated until the concentration C falls within the predetermined range. When the concentration C of the mixture fuel is not within the predetermined range even if the loop is repeated N times, the loop is terminated (K310→K312→K313→K314→K302→K303→K308→K309→K310→K312→K316).

Moreover, when the concentration has been judged to be uncontrollable, the manipulation command signal is output to the fuel supply unit 3 (K315). Specifically, when the concentration C of the mixture fuel detected in step K302 is below the predetermined range, for example, below a lower limit value 1.0M, a manipulation command signal which increases the fuel supply amount $Q_{conc}^{MeOH}$ is output to the fuel supply unit 3. Further, when the concentration C detected in step K302 is above the predetermined range, for example, above an upper limit value 3.0M, a manipulation command signal which decreases the fuel supply amount $Q_{conc}^{MeOH}$ is output to the fuel supply unit 3. After the manipulation command signal is output to the fuel supply unit, the concentration C of the mixture fuel is again judged (K315→K302→K303).

When the processing unit 20 has judged that the concentration C of the mixture fuel is not within the predetermined range and that the volume V is not within the predetermined range either, it judges whether or not the concentration C and the volume V of the mixture fuel are controllable (K301→K302→K303→K308→K309→K311).

When they have been judged to be controllable, the control unit 10 adds weighting factors $a_1$, $b_1$ of a change from a concentration $D_0$ to a concentration $D_1$ of the mixture fuel consumed in the power generation unit 7 and of a change from a consumption speed $L_0$ to a consumption speed $L_1$ of the mixture fuel in the power generation unit 7, thereby deciding the concentration $D_1$ of the mixture fuel and the consumption speed $L_1$ of the mixture fuel. Further, the control unit 10 selects α, β corresponding to $D_1$ and $L_1$, and decides the values of the air supply amount $Q_c^{Air}$ and the fuel supply amount $Q_a^{MeOH}$ which will be the selected parameters α, β, and then outputs the manipulation command signals S5 and S4 to the air supply unit 6 and the fuel circulation unit 5. When the volume and the concentration of the mixture fuel are within the predetermined ranges after the predetermined time ΔT has passed from the output of the manipulation command signals, the control unit outputs the manipulation signals S5 and S4 to the fuel circulation unit 5 and the air supply unit 6, respectively, to return the air supply amount $Q_c^{Air}$ and the fuel supply amount $Q_a^{MeOH}$ to the values during rated operation (K311→K312→K313→K314→K302→K303→K304→K305→K306).

Furthermore, when the concentration and volume of the mixture fuel do not fall within the predetermined ranges even after the predetermined time ΔT has passed, the control loop is repeated until they fall within the predetermined range. When the concentration C and the volume V of the mixture fuel are not within the predetermined range even if the loop is repeated N times, the loop is terminated (K311→K312→K313→K314→K302→K303→K308→K309→K311→K312→K316).

Moreover, when they have been judged to be uncontrollable, the processing unit 20 controls the fuel supply amount $Q_{conc}^{MeOH}$ to judge whether or not the volume V of the mixture fuel is controllable (K311→4K317). Here, as to whether or not the volume of the mixture fuel is controllable, a predetermined upper limit value and lower limit value are preset, and the volume can be judged to be controllable when it is within a range below the upper limit value and above the lower limit value, while the volume can be judged to be uncontrollable when it is out of this range. The predetermined upper limit value and lower limit value are values different from the standard of judgment of controllability in step K307 and step K311, but are a predetermined range to judge whether or not the control of the fuel supply amount $Q_{conc}^{MeOH}$ allows the control of the volume.

When it has been judged that the volume of the mixture fuel is controllable by controlling the fuel supply amount $Q_{conc}^{MeOH}$, the manipulation command signal is output to the fuel supply unit 3 (K315). Specifically, when the concentration of the mixture fuel detected in step K302 is below the predetermined range, for example, below a lower limit value 1.0M, a manipulation command signal which increases the fuel supply amount $Q_{conc}^{MeOH}$ is output to the fuel supply unit 3. Further, when the concentration of the mixture fuel detected in step K302 is above the predetermined range, for example, above an upper limit value 3.0M, a manipulation command signal which decreases the fuel supply amount $Q_{conc}^{MeOH}$ is output to the fuel supply unit 3. After the manipulation command signal is output to the fuel supply unit, the concentration of the mixture fuel is again judged (K315→K302→K303).

When it has been judged that the concentration of the mixture fuel is uncontrollable by controlling the fuel supply amount $Q_{conc}^{MeOH}$, processing is terminated (K317→K316).

According to the present embodiment, not only $Q_c^{Air}$ and $Q_a^{MeOH}$ but also $Q_{conc}^{MeOH}$ is added to control targets, controllable domains of the concentration and volume are further expanded.

Fourth Embodiment

In the present embodiment, there will be described a passive fuel cell system 1A mainly using natural force (e.g., capillary force) to carry a fluid. The passive fuel cell system 1A of the present embodiment is different from the fuel cell system 1 shown in the first to third embodiments in that it does not necessarily require a fuel supply unit 3 and an air supply unit 6 whose manipulated variables are controllable.

Figure 16:
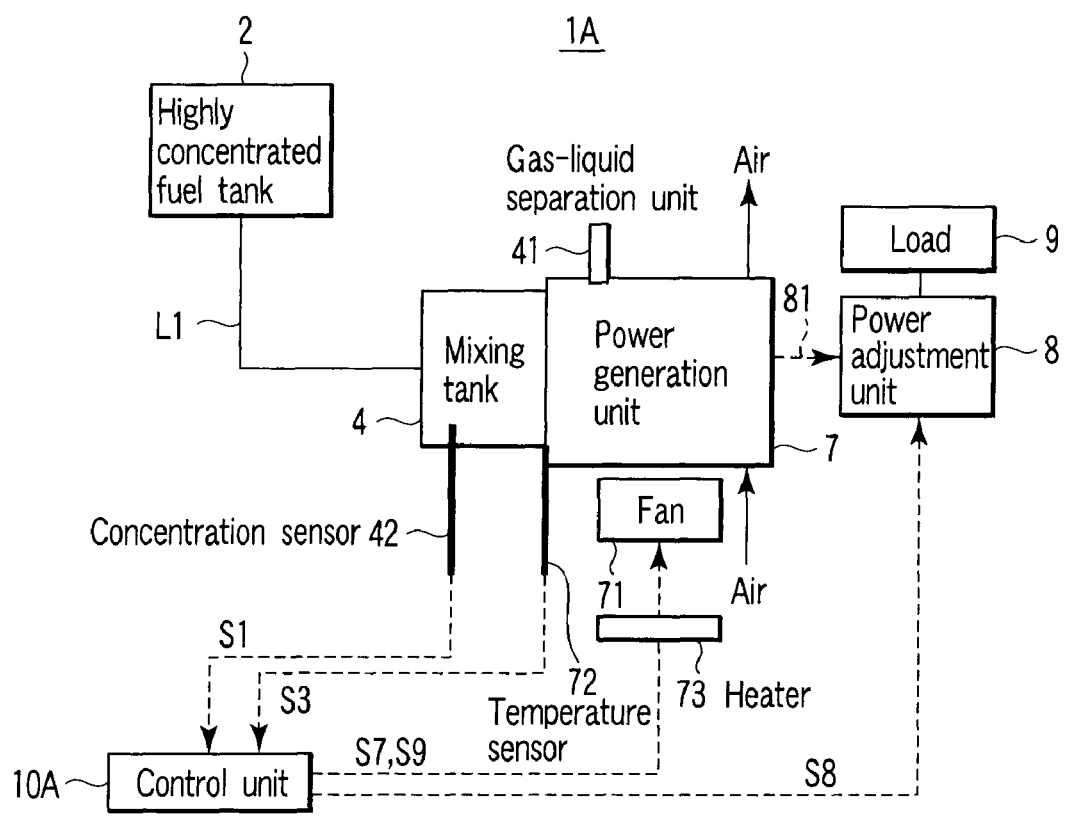
FIG. 16 is a configuration block diagram showing a fuel cell system according to another embodiment of the present invention.

As shown in FIG. 16, the fuel cell system 1A comprises a power generation unit 7, a highly concentrated fuel tank 2, a mixing tank 4, a power adjustment unit 8, a gas-liquid separation unit 41, at least one of an air-cooling fan 71 and a heater 73, a temperature sensor 72 and a control unit 10A.

The overall fuel cell system 1A is totally controlled by the control unit 10A. The control unit 10A is connected to the power generation unit 7 and auxiliary equipment by signal lines, and various signals are transmitted/received among the control unit 10A, the power generation unit 7 and the auxiliary equipment. For example, a concentration sensor 42 detects the concentration of a mixture fuel (e.g., a methanol solution) in the mixing tank 4, and sends a concentration detection signal S1 to the control unit 10A. The temperature sensor 72 detects the temperature of the power generation unit 7, and sends a temperature detection signal S3 to the control unit 10A.

Figure 17:
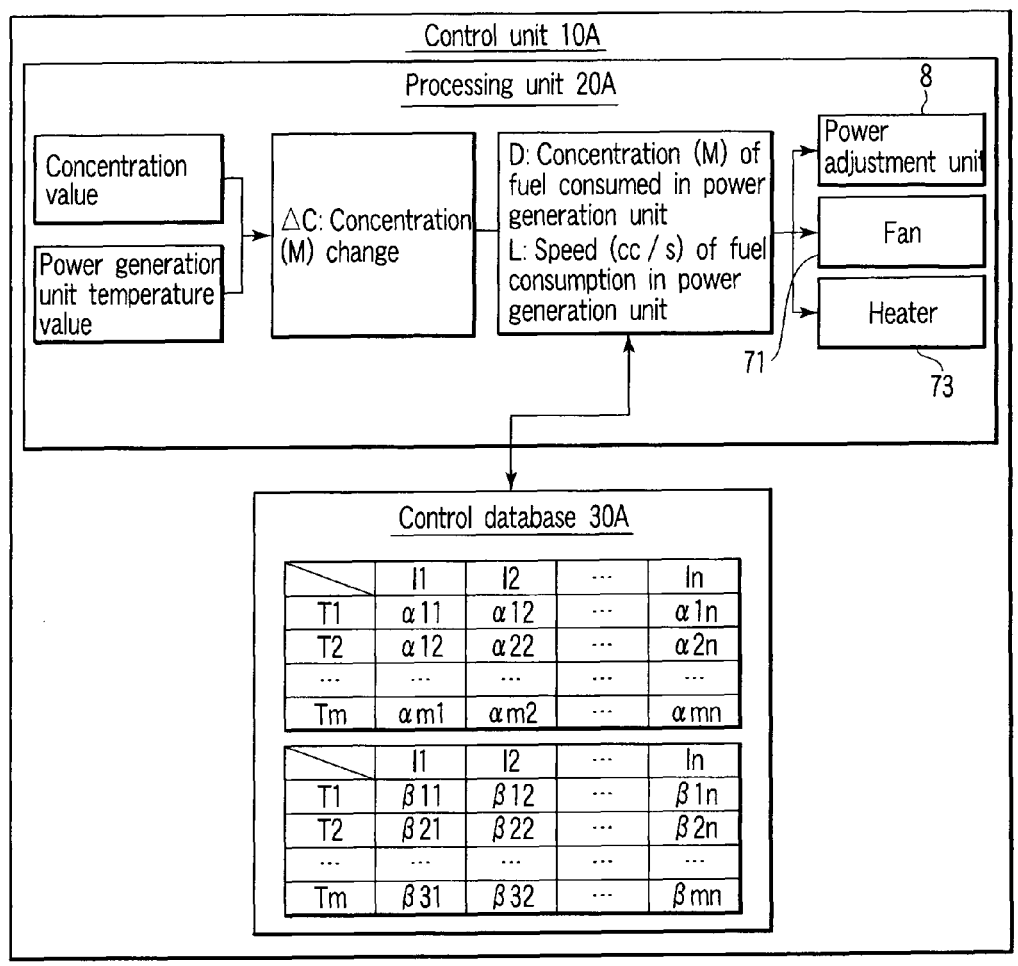
FIG. 17 is a control block diagram of the fuel cell system shown in FIG. 16.

As shown in FIG. 17, the control unit 10A obtains various controlled variables on the basis of the detection signals S1 and S3 and of process data in a control database 30A, and obtains various manipulated variables on the basis of the obtained controlled variables and various parameter values of a processing unit 20, thus outputting manipulation command signals S7, S8 and S9 to any one or two or more of the fan 71 the power adjustment unit 8 and the heater 73. For example, if the manipulation signal S8 is output from the control unit 10A to the power adjustment unit 8, a load current I applied to a load 9 is adjusted to a desired value. It is to be noted that the control database 30A stores, as the process data, a table which relates cell temperature T, and the load current I with $\alpha$, $\beta$, as shown in FIG. 17.

The power generation unit 7 is provided adjacently to the mixing tank 4, and an anode of an MEA thereof is provided so that the mixture fuel in the mixing tank 4 can contact the anode. Moreover, a cathode thereof is provided at a place which allows air outside the fuel cell system 1A to be supplied thereto and allows by-product water to be discharged to the outside of the system.

Furthermore, the power generation unit 7 has at least one of the fan 71 and the heater 73, and the temperature sensor 72. The fan 71 and the heater 73 are used as temperature adjustment means of the power generation unit 7. The fan 71 blows cool air to the power generation unit 7, and cools down the power generation unit 7. The heater 73 resists and generates heat by power supply from an unshown power source, and heats the power generation unit 7. The temperature sensor 72 detects the temperature of the power generation unit 7, and sends the temperature detection signal S3 to the control unit 10A. Moreover, the fan 71 supplies air to the cathode of the MEA, and used as means for discharging the by-product.

A liquid is used for the mixture fuel supplied to the anode. Hereinafter, the methanol solution is assumed as one example of the mixture fuel. The highly concentrated fuel tank 2 stores a raw fuel (e.g., a methanol solution having a purity of 99.9% or more) or a highly concentrated fuel including a small amount of water (e.g., a mixed solution of methanol and water having a concentration of 10M or more). The highly concentrated fuel tank 2 can be supplied with the fuel from an unshown supply port.

The mixing tank 4 communicates with the highly concentrated fuel tank 2 via a line L1. In the mixing tank 4, the raw fuel or the highly concentrated fuel from the highly concentrated fuel tank 2 is mixed with a mixed solution returned from the anode of the power generation unit 7. The mixing tank 4 has a mechanism which fills the inside of the mixing tank 4 with the mixture fuel. Thus, if the highly concentrated fuel tank 2 is installed on the top of the mixing tank 4 to provide a structure in which the raw fuel or the highly concentrated fuel is supplied from the highly concentrated fuel tank 2 by gravitation when the liquid volume in the mixing tank 4 has decreased. It is to be noted that the mixing tank 4 contains a diluted methanol solution having an initial concentration ranging from 1.5M to 2.5M (mol/liter), and the mixture fuel is supplied from the mixing tank 4 to the power generation unit 7 by a water head difference or gas pressure from the highly concentrated fuel tank 2.

A gas-liquid separation unit 41 is attached to the power generation unit 7. The gas-liquid separation unit 41 has a gas-liquid separation film to separate carbon dioxide gas from the mixed solution. The gas-liquid separation unit 41 is provided on the top of the power generation unit 7, and discharges carbon dioxide through the gas-liquid separation unit 41 by use of gravitation.

The mixing tank 4 comprises the concentration sensor 42 as means for detecting the concentration of the mixture fuel. The concentration sensor 42 is installed at a proper place inside the mixing tank 4. However, the concentration sensor 42 is an optional component in the system of the present invention. This is because the concentration of the fuel can also be detected by software instead of the concentration sensor (hardware). That is, the control unit 10A can possess a computer program which estimates the concentration of the fuel from the output and the information on the temperature of the power generation unit 7. It is to be noted that, for example, a supersonic type or near-infrared multiple wavelength light type concentration sensor can be used for the concentration sensor 42.

The power adjustment unit 8 is provided between the power generation unit 7 and the load 9 to smoothly take an output from the power generation unit 7 out to the load 9. A circuit in the power adjustment unit 8 is connected to an output side of the control unit 10, so that the load current I applied to the load 9 is controlled. It is to be noted that power generated in the power generation unit 7 is output to the power adjustment unit 8 via a lead wire 81.

Since the fuel cell system 1A of the present embodiment has a structure which does not necessarily require a fuel circulation unit 5 and an air supply unit 6, the fuel cell system 1A can be simplified, but it is not necessarily possible to manipulate the fuel circulation unit 5 and the air supply unit 6 to change $\alpha$, $\beta$ and control the concentration of the mixture fuel, as it is possible in the fuel cell system 1 shown in the first embodiment. Moreover, since this structure does not necessarily require the fuel supply unit 3 either, it is not necessarily possible to manipulate the fuel supply unit 3 to control the concentration of the mixture fuel.

In such a case, a temperature T of the power generation unit 7 and the power adjustment unit 8 are used as the manipulated variables to control the concentration of the mixture fuel supplied to anode. In order to manipulate the temperature T of the power generation unit 7, the rotation number of the fan 71 is adjusted to control the degree of cooling the power generation unit 7, or energy supplied to the heater 73 is adjusted to control the degree of heating the power generation unit 7, while monitoring the temperature of the power generation unit 7 by the temperature sensor 72 (e.g., a thermocouple).

The concentration sensor 42 detects the concentration of the mixture fuel from the results in FIGS. 10 and 11, and when the control unit 10A has judged that the detected concentration of the mixture fuel is high, the power adjustment unit 8 is manipulated to increase the load current I taken out of the power generation unit 7. At this point, an operation to increase the rotation number of the fan 71 or an operation to reduce the energy supplied to the heater 73 is performed. In the regard, it is preferable to drop the temperature T of the power generation unit 7 to restrain a decrease in the amount of the mixture fuel in the mixing tank 4. If the load current I is increased to decrease the volume of the mixture fuel in the mixing tank 4, the raw fuel or the highly concentrated fuel corresponding to the decrease flows from the highly concentrated fuel tank 2 into the mixing tank 4, so that the consumption amount of the raw fuel or the highly concentrated fuel can be restrained by dropping the temperature T.

On the contrary, when the control unit 10A has judged that the detected concentration of the mixture fuel is low, the power adjustment unit 8 is manipulated to decrease the load current I taken out of the power generation unit 7. At this point, an operation to decrease the rotation number of the fan 71 or an operation to increase the energy supplied to the heater 73 is performed. In the regard, it is preferable to raise the temperature T of the power generation unit 7 to restrain an increase in the amount of the mixture fuel in the mixing tank 4. If the load current I is decreased to increase the concentration of the mixture fuel in the mixing tank 4, the flow of the raw fuel or the highly concentrated fuel from the highly concentrated fuel tank 2 into the mixing tank 4 is reduced in response to the above increase, then, that a decrease in the concentration of the mixture fuel in the mixing tank 4 can be restrained by raising the temperature T.

Consequently, when the control unit has judged that one or both of the concentration and volume of the mixture fuel is/are abnormal in accordance with the state thereof, the power generation unit temperature T or the load current I or both of them is/are manipulated on the basis of the correlation of the power generation unit temperature T, the load current I and α, β, thereby allowing the control of the concentration of the mixture fuel.

Fifth Embodiment

FIG. 18 shows a fuel cell system according to a fifth embodiment, which is obtained by modifying the fuel cell system of FIG. 1.

In the fuel cell system shown in FIG. 18, elements similar to those in FIG. 1 are denoted by corresponding reference numbers, and are described briefly. For particulars concerning them, see the descriptions given thereof with reference to FIG. 1. The fuel cell system shown in FIG. 18 comprises a power generation unit 7 for generating power, a highly concentrated fuel tank 2 that contains, as fuel, methanol or a methanol aqueous solution containing methanol and a small amount of water, and auxiliary equipment necessary for power generation. The auxiliary equipment includes a fuel supply unit 3 for supplying highly concentrated fuel contained in the highly concentrated fuel tank 2, a mixing tank 4 for mixing raw fuel or highly concentrated fuel with collected unreacted mixed solution, a fuel circulation unit 5 for circulating the fuel from the mixing tank 4, and a load 9 to be supplied with power. The auxiliary equipment also includes a power adjustment unit 8 for adjusting the power output from the power generation unit 7 and supplying it to the load, a control unit 10 for controlling each unit of the fuel cell system, a gas-liquid separation unit 41, a concentration sensor 42 for detecting the concentration of fuel supplied to the power generation unit 7, a liquid volume sensor 43 for detecting the volume of the fuel contained in the mixing tank 4, a fan 71 for cooling the power generation unit 7 and supplying air to the cathode-side of the unit 7, and a temperature sensor 72 for detecting the temperature of the power generation unit 7.

More specifically, the mixing tank 4 contains a methanol aqueous solution of a preset concentration to be supplied to the power generation unit 7. The fuel circulation unit 5 supplies the power generation unit 7 with the methanol aqueous solution in the mixing tank 4, and returns an unreacted mixture solution into the mixing tank 4. The fuel supply unit 3 supplies the mixing tank with the fuel contained in the highly concentrated fuel tank 2. The power adjustment unit 8 adjusts an external load on the power generation unit 7 in accordance with the power necessary for the load 9. Further, when an external power supply (external battery, not shown) is connected to the fuel cell system, as well as the power generation unit 7, the power generated by the power generation unit 7 can be accumulated in the external power supply (external battery). The gas-liquid separation unit 41 discharges, to the outside of the power generation unit 7, the gas (carbon dioxide) produced during the reaction in the power generation unit 7. The gas-liquid separation unit 41 may be contained in the power generation unit 7 as shown in FIG. 18, or be provided across a line L5 between the mixing tank 4 and the power generation unit 7, or be contained in the mixing tank 4. The concentration sensor 42 detects the concentration of the fuel supplied to the power generation unit 7. In the system shown in FIG. 18, the concentration sensor 42 is provided across a line L4 between the fuel circulation unit 5 and the power generation unit 7. However, the sensor 42 may be provided in the mixing tank 4 as shown in FIG. 1, or across a line L3 between the mixing tank and the fuel circulation unit 5, or across a line L4 between the fuel circulation unit 5 and the power generation unit 7. Further, when the concentration of fuel can be determined from, for example, the output of the power generation unit 7, no concentration sensor 42 may be employed. The liquid volume sensor 43 detects the volume of the methanol aqueous solution contained in the mixing tank 4. The temperature sensor 72 detects the temperature of the power generation unit 7. The fan 71 is controlled in accordance with the detected temperature to cool the power generation unit 7 heated during electrochemical reaction in the unit 7, thereby adjusting the temperature of the power generation unit 7 to a preset temperature range. The air supplied through the fan 71 is guided as breathing air to the cathode side of the power generation unit 7, while the methanol aqueous solution is guided to the anode side of the power generation unit 7 by the fuel circulation unit 5, whereby power is generated and supplied to the load 9 via the power adjustment unit 8.

The power generation unit 7 shown in FIG. 1 is supplied with air from the air supply unit 6 via the line L6. On the other hand, in the fuel cell system of FIG. 18, the air supply unit 6, the line L6 and the line L7 are not provided, and air is supplied from the fan 71 to the power generation unit 7 to cool the unit 7. Further, the concentration sensor 42 is not provided in the mixing tank 4, but across the line L4 between the fuel circulation unit 5 and the power generation unit 7.

The power generation unit 7 has a structure in which the cathode-side space is exposed to the outside and can take in air through the fan 71. Specifically, as is disclosed in US 2007/0072051 A1 (corresponding to Jpn. Pat. Appln. KOKAI Publication No. 2007-95581), the anode side of the power generation unit 7 has a fuel circulation path, through which fuel penetrates into the catalyst-layer/electrolyte-layer/catalyst-layer. Further, the cathode side is formed of a channel plate made of a porous material, that is, the cathode side is exposed to the ambient air. At the anode side, electromechanical reaction of fuel or methanol aqueous solution occurs to thereby produce carbon dioxide, protons and electrons. At the cathode side, protons react with the oxygen contained in the air supplied from the fan 71, thereby creating water. This water is absorbed in the porous material of the cathode side, and evaporates into the air supplied. The carbon dioxide produced at the anode side is separated from a mixture solution (a mixture solution of unreacted fuel that is not consumed by the anode and water) in the liquid-gas separation unit 41 and discharged to the outside. The mixture solution is returned to the mixing tank 4 through the line L5 as an anode collection line.

The power generation unit 7 shown in FIG. 18 is not limited to the structure disclosed in US 2007/0072051 A1 (corresponding to Jpn. Pat. Appln. KOKAI Publication No. 2007-95581). It is sufficient if the cathode side is exposed to the ambient air and can take it in. For example, the power generation unit 7 may have the structure disclosed in US 2006/0029851 A1.

In the fuel cell system 1 shown in FIG. 18, the fuel circulation unit 5 is operated to supply the mixture fuel from the mixed fuel tank 4 to the anode of the power generation unit 7, and air is supplied by the fan 17 to the cathode side in the generating unit. If the system 1 is connected to the load 9 via the power adjustment unit 8, the power generation is started, and methanol and water cause an oxidative reaction in the anode, and moreover, and methanol and water are consumed by crossover movement.

The mixed solution which has not been consumed in the power generation unit 7 and the carbon dioxide (reaction product) are supplied to the gas-liquid separation unit 41. In the gas-liquid separation unit 41, the mixed solution and the carbon dioxide are separated so that the mixed solution is supplied to the line and the carbon dioxide is discharged outside of the power generation unit 7. The mixed solution is sent into the mixing tank 4 through the line L5. The fuel supply unit 3 supplies the raw fuel or the highly concentrated fuel to the mixing tank 4 depending on the fuel volume in the mixing tank 4. For example, the fuel having a volume equal to that of the flux of methanol and water consumed in the power generation unit 7 is supplied into the mixing tank 4.

The concentration and volume of the mixture fuel in the mixing tank 4 are measured by the sensors 42 and 43, respectively, and the measurement data are sent to the control unit 10. The control unit 10 manipulates the fuel circulation unit 5, the fuel supply unit 3 or the fan 71 on the basis of the measurement data and predetermined process data to have proper concentration and volume of the mixture fuel in the mixing tank 4. Thus, in the fuel cell system 1, the mixture fuel having proper concentration is supplied to the power generating unit 7 at a proper supplying rate and an electric power is outputted from the power generating unit 7 under the optimum condition.

A description will now be given of a method of controlling the concentration of the fuel supplied to the power generation unit 7, and a method of controlling the volume of the methanol aqueous solution contained in the mixing tank 4, which are employed in the fuel cell system shown in FIG. 18.

Figure 21:
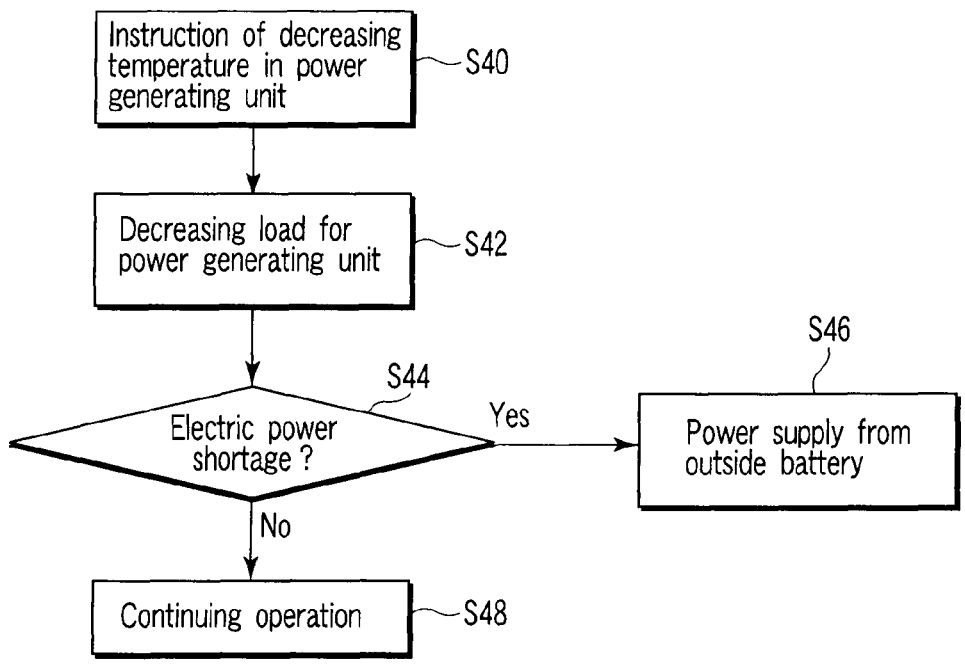
FIG. 21 is a flowchart useful in explaining a process performed in the fuel cell system of FIG. 18 when the volume of fuel is reduced.
Figure 22:
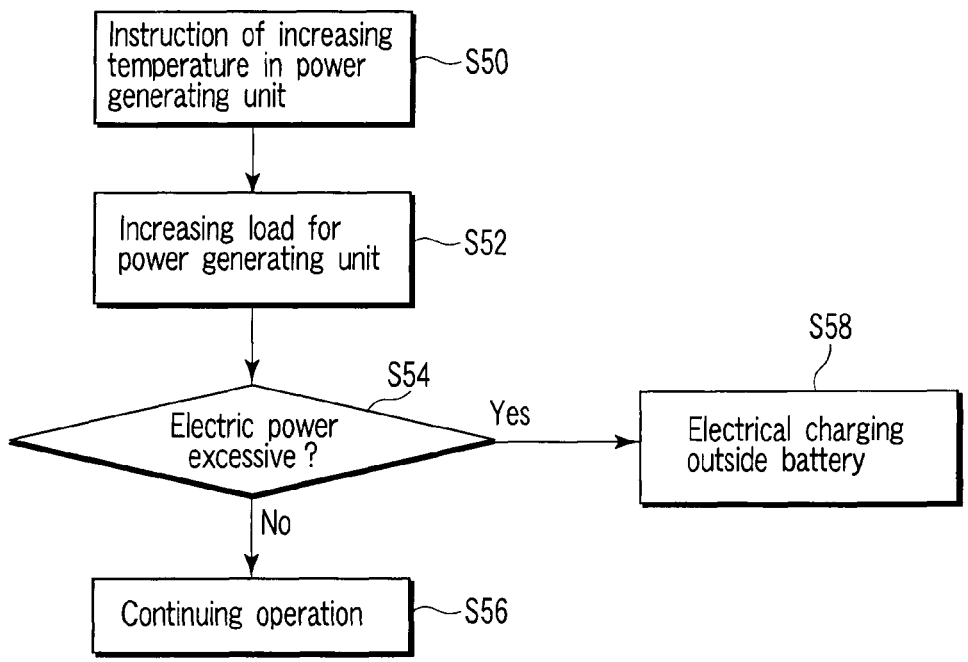
FIG. 22 is a flowchart useful in explaining a process performed in the fuel cell system of FIG. 18 when the volume of fuel is increased.

The fuel concentration control method and the fuel volume control method are illustrated in FIGS. 19 and 20, respectively. The fuel concentration control and the fuel volume control can be executed independently of each other during the operation of the fuel cell system. FIGS. 21 and 22 are flowcharts illustrating control of adjusting an external load on the power generation unit 7, performed in relation to the processes of FIGS. 19 and 20 to control the temperature of the power generation unit 7.

The control methods of FIGS. 19 and 20 and the temperature control methods of FIGS. 21 and 22 can also be used in the fuel cell system of FIG. 1, as well as in the fuel cell system of FIG. 18. It is a matter of course that even in the fuel cell system of FIG. 1, fuel concentration and volume may be controlled independently.

In the liquid volume control shown in FIG. 19, the liquid volume sensor 43 detects the volume of fuel in the mixing tank 4 at the first step S10. At the next step S12, it is determined from a sensor signal S2 output from the liquid volume sensor 43 whether the liquid volume falls within a preset range. If it is determined at step S12 that the volume of the liquid in the mixing tank 4 falls within the preset range, the temperature of the power generation unit 7 is maintained at step S14 to continue the operation of the fuel cell system, since the determination result indicates that an appropriate volume of fuel can be continuously supplied from the mixing tank 4 to the power generation unit 7. At this time, to maintain the temperature of the power generation unit 7, the operation of the fan 71 is controlled based on a sensor signal S3 supplied from the temperature sensor 72. Namely, the fan 71 is controlled to maintain the sensor signal S3 from the temperature sensor 72 at a preset level, to adjust the volume of air supplied.

In contrast, if it is determined at step S12 that the volume of the liquid in the mixing tank 4 falls outside the preset range, and it is determined at step S16 that the volume is reduced, the temperature of the power generation unit 7 is reduced at step S18, since the determination result indicates that an appropriate volume of fuel cannot continuously be supplied from the mixing tank 4 to the power generation unit 7. To reduce the temperature of the power generation unit 7, the flow of air through the fan 71 is increased based on the sensor signal S3 from the temperature sensor 72.

The amount of heat produced by the power generation unit 7, which is described referring to FIG. 21, is reduced as the load on an external circuit including the load 9 connected to the power generation unit 7 is reduced. Accordingly, the temperature of the power generation unit 7 can be reduced by reducing the load of the external circuit including the load 9. When the temperature of the power generation unit 7 is reduced, the consumption of fuel is reduced to thereby suppress reduction of the amount of the liquid contained in the mixing tank 4.

If it is determined at step S12 that the volume of the liquid in the mixing tank 4 falls outside the preset range, and it is determined at step S16 that the volume is not reduced, the temperature of the power generation unit 7 is increased at step S20. To increase the temperature of the power generation unit 7, the rotational speed of the fan 71 is reduced based on the sensor signal S3 from the temperature sensor 72 to reduce the flow of air through the fan 71. When the temperature of the power generation unit 7 is increased, the consumption of fuel is increased to thereby reduce the amount of the liquid contained in the mixing tank 4.

As will be described later with reference to FIG. 22, the greater the load, the greater the heat produced by the power generation unit 7. Accordingly, the temperature of the power generation unit 7 can be increased by increasing the load of the external circuit including the load 9 connected to the power generation unit 7. Further, a heater (not shown) may be provided for the power generation unit 7 to control the heater temperature based on the sensor signal S3 from the temperature sensor 72 to control the heater in such a manner that the temperature of the power generation unit 7 is increased.

When the temperature of the power generation unit 7 is reduced by reducing the external load as described above, the control unit 10 outputs, at step S40 in FIG. 21, an instruction signal S8 to instruct the power adjustment unit 8 to reduce the temperature of the power generation unit 7. In response to the instruction signal S8, the power adjustment unit 8 performs a load adjusting operation. At step S42, based on the output of the temperature sensor 72, the control unit 10 outputs an instruction signal S8 to instruct the power adjustment unit 8 to set, to a preset value, the load on the power generation unit 7. In response to the instruction signal S8, the power adjustment unit 8 switches internal circuits to adjust, to a low value, the external load including the load 9 connected to the power generation unit 7. After switching the external load, the power adjustment unit 8 detects the power generated by the power generation unit 7. If it is determined at step S44 that the output power is sufficient, the operation of the system is continued at step S48, thereby extracting power from the power generation unit 7, using the adjusted external load. In contrast, if it is determined at step S44 that the output power is insufficient, auxiliary power is supplied, at step S46, from an external power supply (not shown), such as an external battery, to the load 9 after the auxiliary power is adjusted by the power adjustment unit 8.

As described above, the volume of the liquid in the mixing tank is gradually increased by quickly reducing the temperature of the power generation unit 7, as is shown in FIG. 11. When the liquid volume sensor detects that the liquid volume is returned to a preset range, the temperature of the power generation unit 7 is returned to a preset value, thereby continuing the operation.

Further, when the temperature of the power generation unit 7 is increased by increasing the external load, the control unit 10 outputs, at step S50 in FIG. 22, an instruction signal S8 to instruct the power adjustment unit 8 to increase the temperature of the power generation unit 7. In response to the instruction signal S8, the power adjustment unit 8 performs a load adjusting operation. At step S52, based on the output of the temperature sensor 72, the control unit 10 outputs an instruction signal S8 to instruct the power adjustment unit 8 to set, to a preset value, the load on the power generation unit 7. In response to the instruction signal S8, the power adjustment unit 8 switches internal circuits to adjust, to a high value, the external load including the load 9 connected to the power generation unit 7. After switching the external load, the power adjustment unit 8 detects the power generated by the power generation unit 7. If it is determined at step S54 that the output power is not excessive, the operation of the system is continued at step S56, thereby extracting power from the power generation unit 7, using the adjusted external load. In contrast, if it is determined at step S54 that the output power is excessive, at step S58, excessive power is supplied to an external power supply (not shown), such as an external battery, via the power adjustment unit 8, thereby charging the external battery.

As described above, the volume of the liquid in the mixing tank is gradually reduced by quickly increasing the temperature of the power generation unit 7, as is shown in FIG. 11. When the liquid volume sensor detects that the liquid volume is returned to a preset range, the temperature of the power generation unit 7 is returned to a preset value, thereby continuing the operation.

In the concentration control shown in FIG. 20, the concentration of fuel is detected from the output of the concentration sensor 42 at step S22. If the fuel cell system of FIG. 1 or 18 has no concentration sensor 42, the control unit 10 estimates the concentration at step S22, based on the output power of the power generation unit 7 monitored by the power adjustment unit 8. At the next step S24, it is determined whether the detected or estimated concentration falls within a preset range. If the detected or estimated concentration falls within the preset range, the fuel supply unit 3 is controlled to continue the operation with the feed rate or the feed amount of fuel maintained.

In contrast, it is determined at step S24 that the detected or estimated concentration is lower than the preset range, the fuel supply unit 3 is controlled at step S30 to increase the volume of fuel supplied from the fuel supply unit 3 to a value higher than a preset value. As a result, highly concentrated fuel is supplied from the fuel supply unit 3 to the mixing tank 4 to increase the concentration of fuel in the tank. The program then returns to step S22, where the fuel concentration is again continuously detected. If it is determined at step S24 that the concentration of fuel is returned to the preset range, the increase of feed rate or feed amount of fuel from the fuel supply unit 3 is stopped at step S26 to thereby return the feed rate or feed amount to a preset value and maintain it. If it is determined at step S28 that the fuel concentration is increased, the fuel supply unit 3 is controlled at step S32 to reduce the feed rate to a value lower than the preset value. The program then returns to step S22, where the fuel concentration is again continuously detected. After the fuel concentration returns to the preset range, the decrease of the feed rate of fuel from the fuel supply unit 3 is stopped at step S26 to thereby return the feed rate to the preset value and maintain it.

FIGS. 23 to 25 show an operation example of the fuel cell system performed in accordance with the flowchart of FIG. 19 and FIG. 20. During this operation, fuel circulation unit was roughly kept constant at around certain value. When the external load was reduced for 50 minutes after 40 minutes elapse from the start of operation, thereby reducing the temperature of the power generation unit 7 to a value lower than a preset value of 60° C. as shown in FIG. 23, the volume of fuel was increased as shown in FIG. 24. Further, the external load was increased for 50 minutes after 110 minutes elapse from the start of operation, thereby increasing the temperature of the power generation unit 7 to a value higher than the preset value of 60° C. At this time, the volume of fuel was reduced as shown in FIG. 24. As shown in FIG. 25, the fuel concentration could be controlled to a preset range by independently operating the fuel supply unit 3 as shown in FIG. 20. Since thus, the temperature of the power generation unit 7 and the concentration of fuel supplied to the power generation unit 7 can be controlled, the fuel cell system can be operated at high efficiency of power generation for a long time.

Sixth Embodiment

Figure 26:
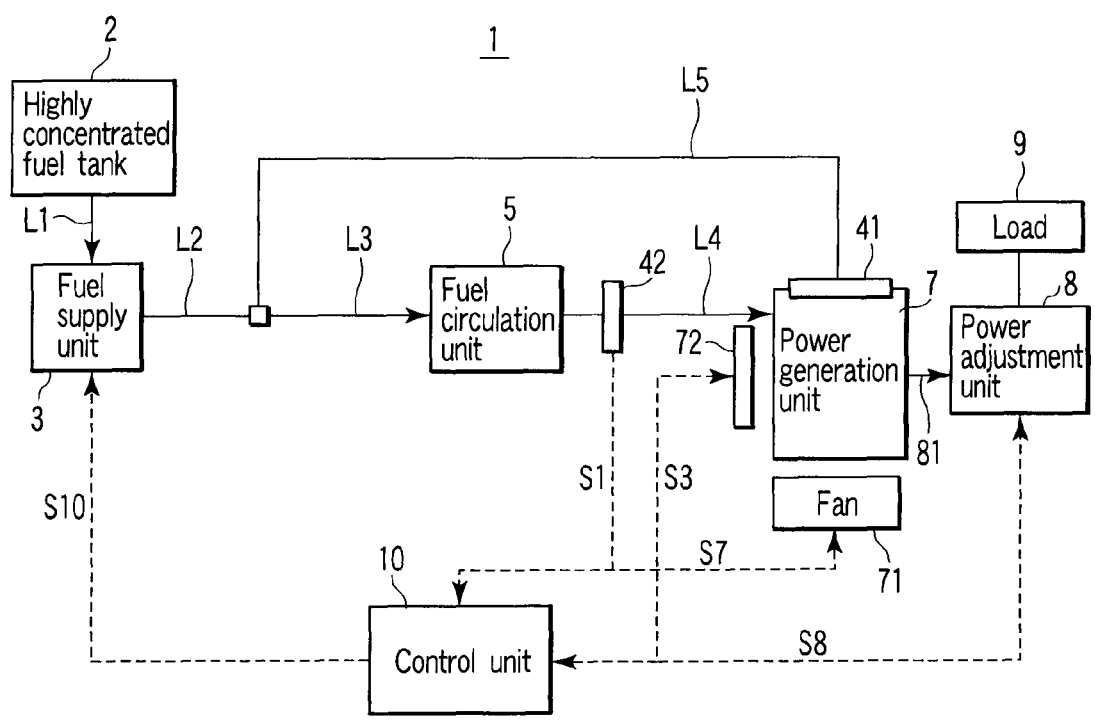
FIG. 26 is a block diagram illustrating a fuel cell system according to a sixth embodiment, which is obtained by modifying the fuel cell system of FIG. 1.

FIG. 26 shows a fuel cell system according to another embodiment, obtained by modifying the fuel cell system of FIG. 18. In FIG. 26, elements similar to those of FIGS. 1 and 18 are denoted by corresponding reference numbers, and no detailed description is given thereof.

The fuel cell system shown in FIG. 26 comprises a power generation unit 7, a highly concentrated fuel tank 2 that contains, as fuel, methanol or a methanol aqueous solution containing methanol and a small amount of water, and auxiliary equipment necessary for power generation. The auxiliary equipment includes a fuel supply unit 3, fuel circulation unit 5, power adjustment unit 8, load 9, control unit 10, concentration sensor 42, fan 71 and temperature sensor 72.

Unlike the fuel cell system of FIG. 18, the fuel cell system of FIG. 26 does not incorporate the mixing tank 4 or liquid volume sensor 43. In this system, the unreacted mixed solution from the gas-liquid separation unit 41 is directly returned to the line L3 via the line L5. The highly concentrated fuel tank 2 has a structure that applies preset pressure to the fuel supply unit 3. The fuel supply unit 3 supplies fuel contained in the highly concentrated fuel tank 2 and interrupts the supply of the fuel. Namely, when the pressure of the fuel circulated via the line L3 is reduced, the fuel supply unit 3 supplies the fuel contained in the highly concentrated fuel tank 2. In contrast, when the pressure of the fuel circulated via the line L3 is increased, the fuel supply unit 3 interrupts the supply of the fuel contained in the highly concentrated fuel tank 2. Accordingly, the pressure of the fuel supplied from the line L3 to the highly concentrated fuel tank is maintained substantially constant, with the result that the pressure of the fuel supplied to the power generation unit 7 is maintained substantially constant, and the pressure of the fuel circulated is also maintained substantially constant. The auxiliary equipment has functions as described with reference to FIGS. 1 and 18.

When reaction has occurred in the power generation unit 7, the methanol aqueous solution is consumed by the reaction and cross over from anode to cathode, and the volume of the methanol aqueous solution circuited through the anode circulation line is reduced by the consumed volume. As described above, the highly concentrated fuel tank 2 has a structure for applying preset pressure to the fuel supply unit 3. Therefore, when the volume of the fuel in the circulation line is reduced as a result of the consumption of fuel in the power generation unit 7, the same volume of highly concentrated fuel in the highly concentrated fuel tank 2 as the consumed one is sent to the fuel supply side via the line L2.

In the system constructed as above, the volume of the methanol aqueous solution that circulates through the anode circulation line is maintained constant. However, if the fuel consumption of the power generation unit 7 and the fuel supply from the highly concentrated fuel tank 2 become out of balance, the fuel concentration fed to power generation unit 7 is varied. If the fuel concentration falls outside a preset range, the efficiency of power generation is reduced. To avoid this, the temperature of the power generation unit 7 and the power extracted therefrom are controlled to make the fuel concentration fall within the preset range.

FIG. 27 shows a concentration control method for use in the fuel cell system of FIG. 26. At step S60, the concentration sensor 42 continuously detects the concentration of fuel, and supplies a concentration sensor signal to the control unit 10. Thus, the fuel concentration is always monitored. Based on the concentration sensor signal, the control unit 10 determines whether the detected concentration falls within a preset range. If it is determined at step S62 that the detected concentration falls within the preset range, the system is controlled at step S64 to maintain the temperature of the power generation unit 7. In contrast, if it is determined at step S62 that the detected concentration falls out of the preset range and it is determined at step S66 that the concentration is decreasing, the system is controlled at step S68 to increase the temperature of the power generation unit 7. As described above, to increase the temperature of the power generation unit 7, the fan 71 is controlled to reduce the cooling rate of the power generation unit 7. Along with or instead of the control of the fan 71, the power adjustment unit 8 is controlled to adjust the external load to increase the amount of heat produced by the power generation unit 7. In addition, to increase the temperature of the power generation unit 7, a heater (not shown) for heating the power generation unit 7 may be turned on to heat the same. When the temperature of the power generation unit 7 is increased, the liquid volume in the anode circulation line is greatly reduced with respect to the fuel concentration, compared to the state before the temperature increase, as is shown in FIG. 11. When the liquid volume is reduced, the feed rate of highly concentrated fuel from the fuel supply unit 3 is increased to increase the concentration. This control is continued until the concentration reaches the preset range. When the detected concentration has reached the preset range, the temperature of the power generation unit 7 is returned to a preset temperature.

In contrast, if the control unit 10 determines at step S62 that the detected concentration falls out of the preset range and is increasing, the system is controlled to decrease the temperature of the power generation unit 7. As described above, to decrease the temperature of the power generation unit 7, the flow of the air through the fan 71 is increased to increase the cooling rate of the power generation unit 7. Alternatively, the power adjustment unit 8 is controlled to reduce the external load, thereby reducing the amount of heat produced by the power generation unit 7. When the temperature of the power generation unit 7 is reduced, the liquid volume in the anode circulation line is increased, compared to the state before the temperature decrease, thereby decreasing the feed rate or feed amount of the highly concentrated fuel from the fuel supply unit 3. This control is continued until the concentration reaches the preset range. When the detected concentration has reached the preset range, the temperature of the power generation unit 7 is returned to the preset temperature.

FIGS. 28 and 29 show an operation example of the fuel cell system performed in accordance with the flowchart of FIG. 27. The operation was performed, with the preset operation temperature set to 60° C. and the external load set to substantially 1.8 A. During operation, fuel circulating units was roughly kept constant so that fuel flow rate became constant at around certain value. As shown in FIG. 29, after 60 minutes elapsed from the start of operation, the fuel concentration was increased, while the external load was reduced to reduce the temperature of the power generation unit 7 lower than 60° C., thereby suppressing increases in the fuel concentration. Thus, the system shown in FIG. 26 could operate reliably at high power generation efficiency for a long time, as shown in FIG. 28.

In the system of FIG. 26, the control unit 10 supplies an interruption signal S10 to the fuel supply unit 3, thereby interrupting the supply of fuel from the fuel supply unit 3 to the line L2, when power generation is stopped or an abnormality occurs. Namely, upon stopping power generation or occurrence of an abnormality, the control unit 10 supplies the interruption signal S10 to interrupt the supply of fuel, and also supplies interruption signals S4 and S8 to the fuel circulation unit 5 and power adjustment unit 8, respectively, to interrupt the circulation of fuel. Further, the power adjustment unit 8 adjusts the external load, including the load 9, on the power generation unit 7 to interrupt power generation.

The operation of the system shown in FIG. 26 is explained with reference to the flowchart shown in FIG. 27. The flowchart shown in FIG. 27 can apply to not only the system shown in FIG. 26 but also can apply the system shown in FIG. 18. In the system shown in FIG. 18, if a concentration of the mixture fuel detected by the concentration sensor 42 is lowered within a predetermined range, the temperature of the power generation unit 7 is increased in accordance with the flowchart shown in FIG. 27. If the temperature of the power generation unit 7 is increased, the amount of the fuel in the mixing tank 4 is decreased. Thus, the high concentrated fuel is so supplied from the fuel tank 2 through the fuel supply unit 3 to the mixing tank 4 as to prevent the decrease of the fuel in the mixing tank 4. In the supply of the fuel, the supply amount of the fuel corresponds to the decreased amount of the fuel in the mixing tank 3 so that the total amount of the fuel in the mixing tank can be maintained within the predetermined range, and the fuel concentration in the mixing tank can be increased.

In addition to the embodiments described above, five manipulated variables of the fuel circulation unit, the fuel supply unit, the air supply unit, the power adjustment unit (load current) and the temperature adjustment means (power generation unit temperature) can be variously combined to control one or both of the concentration and volume of the mixture fuel.

According to the embodiments of the present invention, it is not necessary to separately provide a water tank and a water collection path to adjust the concentration and volume of the mixture fuel, leading to a simpler structure which reduces the size of an apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell system comprising:
a power generation unit including an anode, a cathode and an electrolytic film provided between the anode and the cathode, the anode being supplied with a mixture fuel with a concentration, the cathode being exposed to air, power being generated by electrochemical reaction between the anode and the cathode, a discharge liquid containing an unreacted mixture fuel being discharged from the anode, the power generation unit producing heat as a result of the electrochemical reaction;
a power adjustment unit which adjusts power supplied from the power generation unit;
a fuel supply unit which supplies a raw fuel or a highly concentrated fuel;
a mixing tank provided across a fuel circulation path which permits the discharge liquid from the power generation unit to be circulated to the anode, the mixing tank containing the mixture fuel, the mixture fuel being a mixture of the raw fuel or the highly concentrated fuel and the discharge liquid;
a fuel circulation unit which circulates the mixture fuel from the mixing tank to the anode; and
a volume sensor which detects a volume of the mixture fuel contained in the mixing tank;
a control unit programmed to control temperature of the power generation unit in accordance with the volume of the mixture fuel in the mixing tank, wherein the control unit is programmed to decrease the temperature of the power generation unit when the volume of the mixture fuel is lower than a preset volume range, the control unit is programmed to maintain the temperature of the power generation unit unchanged when the volume of the mixture fuel falls within the preset volume range, and the control unit is programmed to increase the temperature of the power generation unit when the volume of the mixture fuel exceeds the preset volume range.

2. The fuel cell system according to claim 1, wherein the control unit decreases the temperature of the power generation unit by controlling the power adjustment unit to decrease an external load connected to the power generation unit.

3. The fuel cell system according to claim 1, wherein the control unit increases the temperature of the power generation unit by controlling the power adjustment unit to increase an external load connected to the power generation unit.

4. The fuel cell system according to claim 1, further comprising a fan which supplies the power generation unit with the air for cooling the power generation unit, and wherein the control unit controls the fan to control the temperature of the power generation unit and supplies the air to the cathode.

5. The fuel cell system according to claim 1, wherein the power generation unit includes a heater for heating the power generation unit, and the control unit controls the heater to control the temperature of the power generation unit.

6. The fuel cell system according to claim 1, wherein the control unit estimates the concentration of the mixture fuel supplied to the anode, based on the power output from the power generation unit, to control the temperature of the power generation unit.

7. The fuel cell system according to claim 1, wherein when the concentration of the mixture fuel falls within a preset concentration range, the control unit maintains the temperature of the power generation unit unchanged.

8. The fuel cell system according to claim 1, wherein when the concentration of the mixture fuel is lower than a preset concentration range, the control unit increases the temperature of the power generation unit.

9. The fuel cell system according to claim 8, wherein the control unit increases the temperature of the power generation unit by controlling the power adjustment unit to increase an external load connected to the power generation unit.

10. The fuel cell system according to claim 1, wherein the control unit decreases the temperature of the power generation unit when the concentration of the mixture fuel exceeds a preset concentration range.

11. The fuel cell system according to claim 10, wherein the control unit decreases the temperature of the power generation unit by controlling the power adjustment unit to decrease an external load connected to the power generation unit.

* * * * *